US007908393B2

(12) United States Patent
Marr et al.

(10) Patent No.: US 7,908,393 B2
(45) Date of Patent: *Mar. 15, 2011

(54) NETWORK BANDWIDTH DETECTION, DISTRIBUTION AND TRAFFIC PRIORITIZATION

(75) Inventors: James E. Marr, Burlingame, CA (US);
Yutaka Takeda, San Mateo, CA (US);
Attila Vass, Foster City, CA (US);
Payton R. White, Foster City, CA (US);
Stephen C. Detwiler, Oakland, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 12/267,269

(22) Filed: Nov. 7, 2008

(65) Prior Publication Data
US 2009/0144425 A1 Jun. 4, 2009

Related U.S. Application Data

(60) Provisional application No. 60/992,295, filed on Dec. 4, 2007, provisional application No. 60/992,282, filed on Dec. 4, 2007.

(51) Int. Cl.
*G06F 15/16* (2006.01)
*G06F 15/173* (2006.01)
(52) U.S. Cl. ......... 709/232; 709/223; 709/228; 709/238
(58) Field of Classification Search .................. 709/223, 709/228, 232, 238
See application file for complete search history.

(56) References Cited

U.S. PATENT DOCUMENTS

| | | | |
|---|---|---|---|
| 5,313,454 A | 5/1994 | Bustini et al. | |
| 6,247,061 B1 | 6/2001 | Douceur et al. | |
| 6,480,748 B1 | 11/2002 | Gerszberg et al. | |
| 6,661,799 B1 | 12/2003 | Molitor | |
| 6,760,775 B1 * | 7/2004 | Anerousis et al. | 709/238 |
| 6,799,255 B1 | 9/2004 | Blumenau et al. | |
| 6,934,745 B2 * | 8/2005 | Krautkremer | 709/223 |
| 7,016,942 B1 | 3/2006 | Odom | |
| 7,426,185 B1 * | 9/2008 | Musacchio et al. | 370/235.1 |
| 7,529,193 B2 * | 5/2009 | Zimmerman et al. | 370/252 |
| 2002/0049841 A1 * | 4/2002 | Johnson et al. | 709/225 |
| 2002/0075844 A1 | 6/2002 | Hagen | |
| 2003/0223430 A1 | 12/2003 | Lodha | 370/395.41 |
| 2004/0024879 A1 | 2/2004 | Dingman et al. | |

(Continued)

FOREIGN PATENT DOCUMENTS

FR 2829648 3/2003

(Continued)

OTHER PUBLICATIONS

U.S. Appl. No. 60/992,295, filed Dec. 4, 2007.

(Continued)

*Primary Examiner* — Kristie D Shingles
(74) *Attorney, Agent, or Firm* — Joshua D. Isenberg; JDI Patent

(57) ABSTRACT

Network bandwidth detection and distribution and prioritizing network traffic among two or more distinct channels of communication within a single application in a node configured to communicate with one or more other nodes over a network is disclosed. For a particular time quantum, a bandwidth quantum may be distributed amongst two or more communication channels according to priorities associated with those channels.

34 Claims, 13 Drawing Sheets

U.S. PATENT DOCUMENTS

| | | | |
|---|---|---|---|
| 2004/0139228 A1 | 7/2004 | Takeda et al. | |
| 2005/0105526 A1 | 5/2005 | Stiemerling et al. | |
| 2005/0251577 A1 | 11/2005 | Guo et al. | |
| 2005/0259637 A1 | 11/2005 | Chu et al. | |
| 2005/0262411 A1 | 11/2005 | Vertes | |
| 2006/0075127 A1 | 4/2006 | Juncker et al. | |
| 2006/0209822 A1 | 9/2006 | Hamamoto | |
| 2006/0288103 A1 | 12/2006 | Gobara et al. | |
| 2007/0058792 A1 | 3/2007 | Chaudhari et al. | |
| 2007/0061460 A1 | 3/2007 | Khan et al. | |
| 2007/0081459 A1* | 4/2007 | Segel et al. | 370/230 |
| 2007/0217436 A1 | 9/2007 | Markley et al. | |
| 2008/0298376 A1 | 12/2008 | Takeda | 370/400 |
| 2009/0013175 A1 | 1/2009 | Elliott | |
| 2009/0077245 A1 | 3/2009 | Smelyansky et al. | |
| 2009/0094370 A1 | 4/2009 | Jacob et al. | |
| 2009/0138610 A1 | 5/2009 | Gobara et al. | |
| 2009/0144423 A1 | 6/2009 | Marr | 709/226 |
| 2009/0144424 A1 | 6/2009 | Takeda | 709/226 |
| 2009/0240821 A1 | 9/2009 | Juncker et al. | |

FOREIGN PATENT DOCUMENTS

| | | |
|---|---|---|
| WO | WO2004063843 | 7/2004 |
| WO | WO2005088466 | 9/2005 |
| WO | WO 2009/073312 | 6/2009 |

OTHER PUBLICATIONS

U.S. Appl. No. 60/992,282, filed Dec. 4, 2007.
"DCNET Internet Clock Service", IETF RFC 778, Apr. 18, 1981, David L. Mills.
"DCN Local-Network Protocols", IETF RFC 891, Dec. 1983, David L. Mills.
"Algorithms for Synchronizing Network Clocks", IETF RFC 956, Sep. 1985, David L. Mills.
"Network Time Protocol (NTP)", IETF RFC 958, Sep. 1985, David L. Mills.
"Network Time Protocol (Version 3)", IETF RFC 1305, Mar. 1992, David L. Mills.
"Simple Network Time Protocol (SNTP) Version 4", IETF RFC 2030, Oct. 1996, David L. Mills.
"User Datagram Protocol" in IETF RFC 768, Aug. 28, 1980, J. Postel.
"Cell Broadband Engine Architecture", Aug. 8, 2005, IBMC, SCEI, Toshiba Corporation.
Invitation to Pay Additional Fees and, Where Applicable, Protest Fee dated Apr. 7, 2009 for International Patent Application No. PCT/US2008/083002.
The International Search Report and The Written Opinion of the International Searching Authority dated Jul. 7, 2009 issued for the International Patent Application No. PCT/US2008/083002.
Notice of Allowance and Fees Due dated Jul. 12, 2010 issued for U.S. Appl. No. 12/267,233.
Arno Wacker et al—"A NAT Traversal Mechanism for Peer-to Peer Networks"—Eighth International Conference on Peer-to Peer Computing (P2P'08), 2008. IEEE. pp. 81-83.
Jim Dowling et al.—"Improving ICE Service Selection in a P2P System using the Gradient Topology"—First International Conference on Self-Adaptive and Self-Organizing Systems (SASO 07), 2007, IEEE, pp. 285-288.
European Search Report dated Jan. 28, 2010 issued for European patent application No. 99252219.2.
J. Rosenberg, Simple Traversal of UDP Through Network Address Translators (NAT), BEHAVE Inernet-Draft, Jul. 17, 2005.
J. Rosenberg, Interactive Connectivity Establishment (ICE): A methodology for Network Address Translator (NAT) Traversal for Offer/Answer Protocols, MMusic Internet-Draft, Jul. 17, 2005.
F. Audet, NAT Behavioral Requirements for Unicast UDP, BEHAVE Internet-Draft, Jul. 15, 2005.
J. Rosenberg, Interactive Connectivity Establishment (ICE): A Methodology for Network Address Translator (NAT) Traversal for Multimedia Session Establishment Protocols, MMusic Internet-Draft, Oct. 25, 2004.
J. Rosenberg, Traversal Using Relay NAT (TURN), Midcom Internet-Draft, Oct. 20, 2003.
Y. Takeda, Symmetric NAT Traversal Using STUN, Internet Engineering Task Force, Jun. 2003.
J. Rosenberg, Interactive Connectivity Establishment (ICE): A Methodology for Network Address Translator (NAT) Traversal for Offer/Answer Protocols, MMusic Internet-Draft, Jan. 16, 2007.
J. Rosenberg, Interactive Connectivity Establishment (ICE): A Methodology for Network Address Translator (NAT) Traversal for Multimedia Session Establishment Protocols, MMusic Internet-Draft, Jul. 19, 2004.
J Rosenberg, STUN—Simple Traversal of User Datagram Protocols (UDP) Through Network Address Translator (NATs), Network Working Group, Mar. 2003.
Office Action dated Mar. 24, 2010 issued for U.S. Appl. No. 12/235,409.
Final Office Action dated Jul. 19, 2010 issued for U.S. Appl. No. 12/235,409.
Final Office Action dated Apr. 12, 2010 issued for U.S. Appl. No. 12/243,853.
Office Action dated Oct. 13, 2009 issued for U.S. Appl. No. 11/243,853.
Office Action dated Aug. 31, 2010 issued for U.S. Appl. No. 11/243,853.
Final Office Action dated May 28, 2009 issued for U.S. Appl. No. 11/243,853.
U.S. Appl. No. 12/975,183 filed Dec. 21, 2010.

* cited by examiner

NETWORK BANDWIDTH DETECTION, DISTRIBUTION AND TRAFFIC PRIORITIZATION

CLAIM OF PRIORITY

This application claims the priority benefit of commonly-assigned, co-pending U.S. Provisional Patent application No. 60/992,282 to Yutaka Takeda, James E. Marr, Stephen C. Detwiler, Attila Vass, and Payton White entitled "NETWORK BANDWIDTH DETECTION AND DISTRIBUTION", filed Dec. 4, 2007, the entire disclosures of which are incorporated herein by reference.

This application claims the priority benefit of commonly-assigned, co-pending U.S. Provisional Patent application No. 60/992,295 to James E. Marr, Yutaka Takeda, Attila Vass, Payton White and Stephen C. Detwiler entitled "NETWORK TRAFFIC PRIORITIZATION", filed Dec. 4, 2007, the entire disclosures of which are incorporated herein by reference.

CROSS-REFERENCE TO RELATED APPLICATION

This application is related to commonly-assigned, co-pending U.S. patent application Ser. No. 12/267,254 to Yutaka Takeda, James E. Marr, Stephen C. Detwiler, Attila Vass, and Payton White entitled "NETWORK BANDWIDTH DETECTION AND DISTRIBUTION", filed the same day as the present application, the entire disclosures of which are incorporated herein by reference.

This application is related to commonly-assigned, co-pending U.S. patent application Ser. No. 12/267,233 to James E. Man, Yutaka Takeda, Attila Vass, Payton White and Stephen C. Detwiler entitled "NETWORK TRAFFIC PRIORITIZATION", filed the same day as the present application, the entire disclosures of which are incorporated herein by reference.

FIELD OF THE INVENTION

The present invention relates to computer network communication, and more specifically to prioritizing network traffic among distinct channels of communication within a single application.

BACKGROUND OF THE INVENTION

Computing systems are becoming increasing interconnected through network environments. Such network environments may be centralized or decentralized. A decentralized computing environment may be defined by a number of computing systems interconnected to communicate with one another, wherein each computing system can perform both client and server functions. A peer-to-peer (P2P) network represents an example of a decentralized computing environment in which each computing system within the P2P network is defined as a peer of every other computing system within the network. For discussion purposes, each peer computing system within the P2P network is referred to as a node. Additionally, each node within the P2P network may be configured to execute software having substantially equivalent functionality. Therefore, each node may act as both a provider and a user of data and services across the P2P network. Peer to peer networks are distributed data networks without any centralized hierarchy or organization. Peer to peer data networks provide a robust and flexible means of communicating information between large numbers of computers or other information devices, referred to in general as nodes.

A P2P network relies primarily on the computing power and bandwidth of the participants in the network rather than concentrating it in a relatively low number of servers. P2P networks are typically used for connecting nodes via largely ad hoc connections. Such networks are useful for many purposes. P2P networks may be used, e.g., for sharing content files containing audio, video, data or anything in digital format is very common, and real-time data, such as telephony traffic, may also be transmitted using P2P technology.

P2P applications often involve a significant amount of communication between nodes over different communication channels. By way of example, such channels may include an audio channel, a video channel, and a file transfer channel. A given application, e.g., audio-video (A/V) chat may communicate using all three channels. Typically, an application has a limited amount of network bandwidth available for communication. The application distributes the available bandwidth among the communication channels.

Prior art network implementations involving multiple communication channels typically adopt an "all or nothing" approach that can lead to starvation. For example, consider a very low bandwidth situation where a user is attempting to engage in A/V chat involving transmission of captured audio and video frames. If the user does not have enough bandwidth available to transmit all of the captured audio and video frames, prior art techniques typically gives complete priority to the audio frames and not transmit any video frames. This may reduce quality of service for the A/V chat.

It is within this context that embodiments of the present invention arise.

BRIEF DESCRIPTION OF THE DRAWINGS

Embodiments of the present invention may be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Technical Background

Figure 1:
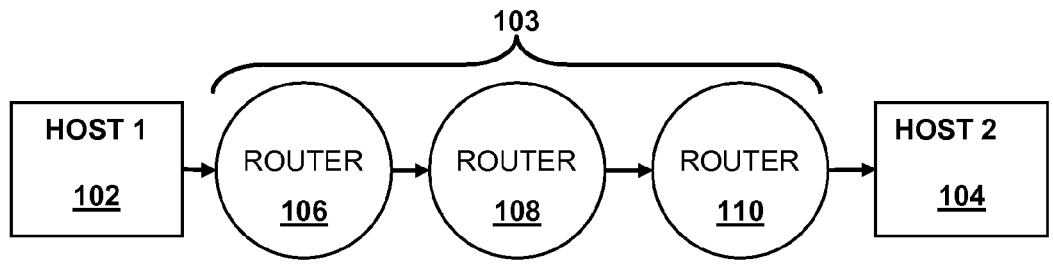
FIG. 1 is a block diagram illustrating a network path between two hosts.

Embodiments of the present invention may be understood in the context of network communications. FIG. 1 illustrates an example of network communication between Host 1 102 and Host 2 104. By way of example, the hosts may be any network capable device. Such devices include, but are not limited to, computers, hand held internet browsers and/or email devices, Voice over Internet Protocol (VoIP) phones, video game consoles, hand held video game devices, and the like. Messages from Host 1 travel to Host 2 over a network path 103 via routers 106, 108, and 110. Each router may have a different Maximum Transmission Unit (MTU). In this example, router 106 has an MTU of 1500 bytes, router 108 has an MTU of 1000 bytes and router 110 has an MTU of 1500 bytes. The path MTU for the path 103 is the smallest MTU of any router in the path, which is 1000 bytes in this example.

Figure 2:
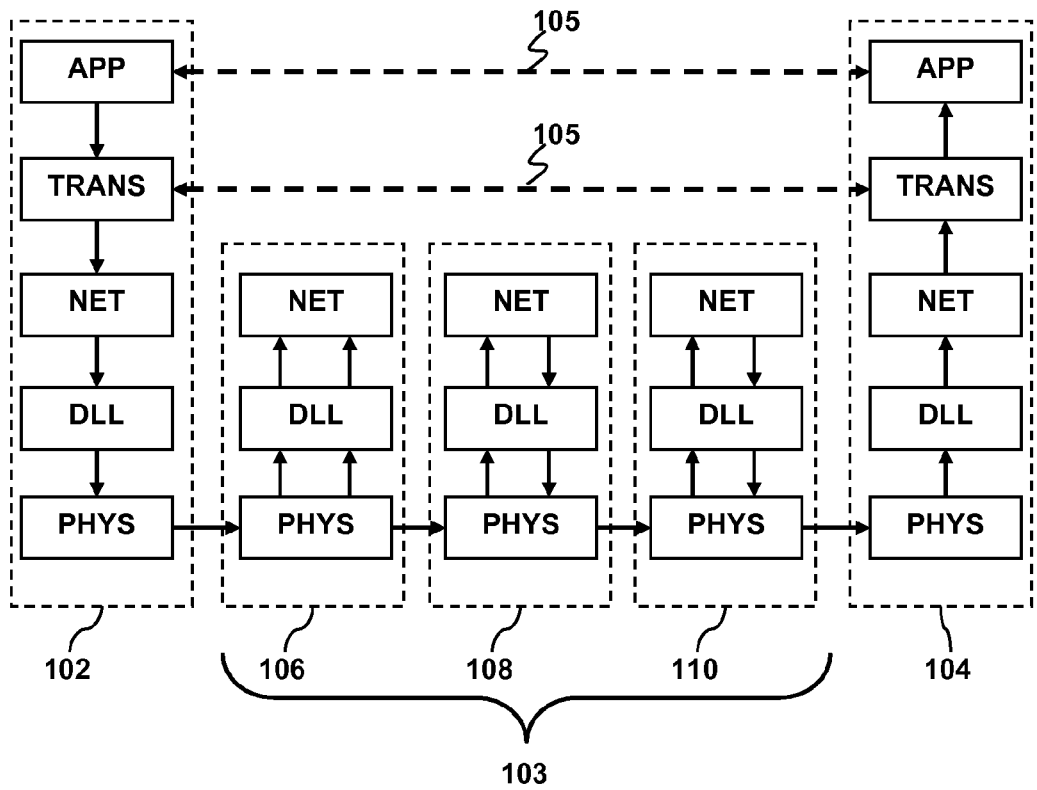
FIG. 2 is a block diagram illustrating the protocol stacks in the hosts and routers of FIG. 1.

The Hosts 102, 104 and routers 106, 108, 110 may be configured to communicate with each other according to a network protocol. FIG. 2 illustrates an example of a network protocol configuration for the situation shown in FIG. 1. By way of example, each host device 102, 104 may be configured (either in software or hardware or some combination of both) with a network protocol stack having five layers: an Application layer APP, a Transport layer TRANS, a Network layer NET (sometimes referred to as the IP layer), a Data Link Layer DLL and a Physical layer PHYS. These layers are well-known to those of skill in the art. The Hosts 102, 104 typically implement all five layers. The routers 106, 108, 110 typically implement only the Network, Data Link and Physical layers.

By way of example, embodiments of the present invention may implement Path MTU discovery at the Application layer. Typically, the Transport layer and below are implemented in an operating system (OS) kernel and applications have no control in changing behavior at these layers. Classic PMTUD, by contrast, is typically implemented at the Transport and IP (Network) layers.

The Application layer APP represents the level at which applications access network services. This layer represents the services that directly support applications such as software for file transfers, database access, and electronic mail. Examples of application layer software include HL7, Modbus, Session Initiation Protocol (SIP), and Simple Sensor Interface Protocol (SSI). In the particular case of the TCP/IP suite, the Application layer APP may be implemented with software protocols such as Hypertext Transfer Protocol (HTTP), Session Initiation Protocol (SIP), Simple Mail Transfer Protocol (SMTP), Short Message Peer-to-Peer Protocol (SMPP), Simple Network Management Protocol (SNMP), File Transfer Protocol (FTP), Teletype Network (TELNET), Network File System (NFS), Network Time Protocol (NTP), Real-time Transport Protocol (RTP), Dynamic Host Configuration Protocol (DHCP), and Domain Name System (DNS). The Application layer APP may sometimes be divided further into a Presentation layer and a Session layer, e.g., in the Open Systems Interface (OSI) protocol. The Presentation layer translates data from the Application layer into an intermediary format. The Presentation layer may also manages security issues by providing services such as data encryption, and compresses data so that fewer bits need to be transferred on the network. The Session layer allows two applications on different computers to establish, use, and end a session. As used herein, a session (also sometimes called a "user session") refers to a particular instance of user interface with an application. By way of example, a session typically begins when the user accesses the application and typically ends when the user quits the application. The Session layer may establish dialog control between the two computers in a session, regulating which side transmits, plus when and how long it transmits.

The Transport layer TRANS handles error recognition and recovery. For a transmitting host, the Transport layer may also repackage long messages when necessary into small packets for transmission. For a receiving host the Transport layer rebuilds packets into the original message. The Transport layer for a receiving host may also send receipt acknowledgments. Examples of particular Transport layer protocols include Transmission Control Protocol (TCP), User Datagram Protocol (UDP) and Stream Control Transmission Protocol (SCTP), all of which, and equivalents thereof, are well-known to those of skill in the art. The Transport layer TRANS is the layer that typically supports packet fragmentation. It is noted that fragmentation may take place in the Transport layer of the host originating a message or at the Transport layer of any of the routers along the path between that host and the message's intended recipient.

The Network layer NET addresses messages and translates logical addresses and names into physical addresses. It also determines the route from the source to the destination computer. The Network layer may also manages traffic problems, such as switching, routing, and controlling the congestion of data packets. Examples of particular Network layer protocols include, but are not limited to, Internet Protocol (IP), Internet Control Message Protocol (ICMP), IP Security (Ipsec), Address Resolution Protocol (ARP), Routing Information Protocol (RIP) and Open Shortest Path First (OSPF) all of which, and equivalents thereof, are well-known to those of skill in the art The Data Link layer DLL packages raw bits from the Physical layer PHYS into frames (logical, structured packets for data). The Data Link layer may also be responsible for transferring frames from one computer to another, without errors. After sending a frame, the Data Link layer DLL waits for an acknowledgment from the receiving computer. Examples of particular Data Link layer protocols include, but are not limited to, Point-to-Point Protocol (PPP), Serial Line Internet Protocol (SLIP) and Media Access Control (MAC) all of which, and equivalents thereof, are well-known to those of skill in the art. The Data Link layer DLL typically limits the MTU size.

The Physical layer PHYS transmits bits from one computer to another and regulates the transmission of a stream of bits over a physical medium. This layer defines how the cable is attached to the network adapter and what transmission technique is used to send data over the cable. Examples of particular Physical layer protocols and standards include, but are not limited to, RS-232, V.35, V.34, 1.430, 1.431, T1, E1, 10BASE-T, 100BASE-TX, POTS, SONET, DSL, 802.11a, 802.11b, 802.11g, 802.11n all of which, and equivalents thereof, are well-known to those of skill in the art A message originating at Host 1 102 starts at the Application layer APP and works its way down the protocol stack to the Physical layer PHYS. When the message arrives as Host 2 104, it is received at the Physical layer PHYS and works its way up the stack to the Application layer APP. In the path 103 between the two hosts 102, 104, the message is received at the Physical layer PHYS of router 106 and works its way up to the Transport layer TRANS and then back down the stack to the Physical layer PHYS for transmission to router 108. The process repeats for routers 108 and 110. In peer-to-peer situations, once a connection has been established between the hosts 102, 104 they may communicate by peer-to-peer connections 105. The peer-to-peer connections 105 are not short cut routes for messages. Instead, a peer-to-peer connection merely indicates that each layer's message, or signal, that is embedded in a message as a header is understood or handled by the counterpart of the same layer entity. The messages between hosts 102 and 104 follow the same path through the routers 106, 108 and 110 regardless of whether it is peer-to-peer or client-server situation.

Embodiments of the present invention are directed to solving the problem of determining the available bandwidth for communication between two nodes over a network. Embodiments of the invention solve this problem by implementing an initial bandwidth estimation and a dynamic transmission rate adjustment corresponding to actual available bandwidth that changes over time. Additionally, embodiments of the invention may implement a way to optimize transmission rate when a node is communicating with more than one remote node, by making use of collective knowledge of bandwidth characteristics of each of the remote nodes. Embodiments of the invention may be applied to various network-related applications including real-time online gaming, multiparty call conference and audio visual (AV) chat applications.

According to an embodiment of the invention a bandwidth sensing module may include an Initial bandwidth measurement stage and a dynamic bandwidth adjustment stage. This fundamental measurement scheme may be further extended to global bandwidth management for applications that communicate with many remote nodes. (e.g. Multi-party AV chat.) The initial bandwidth measurement stage may implement maximum transmission unit (MTU) size discovery, e.g., as described in commonly-assigned U.S. patent application Ser. No. 11/755,693 to Yutaka Takeda, James Marr, and Payton White entitled "NETWORK COMMUNICATION WITH PATH MTU SIZE DISCOVERY", the entire contents of which are incorporated herein by reference. It is noted that initial bandwidth estimation is rather difficult problem. Many existing applications that require knowledge of available network bandwidth assume there is a static amount of bandwidth. Alternatively, an application may ask a user in advance what type of network connection (Dialup, ISDN, Cable-modem, T1/LAN, etc) is being used rather than detecting it dynamically. Embodiments of the present invention may implement completely automatic bandwidth measurement in conjunction with MTU size discovery along with global bandwidth management.

Embodiments of the present invention address a number of different issues associated with network bandwidth management. Specifically, it is useful for a node to be able to make an initial determination of available bandwidth. In addition, it is desirable to be able to adjust a sending rate from the node in response to changes in the available bandwidth. Furthermore, in some embodiments, two or more different applications running on a given node may be communicating over a network. In such a case, it may be useful to determine a policy for bandwidth distribution among the different applications and to manage the bandwidth distribution while the applications are running.

Figure 3:
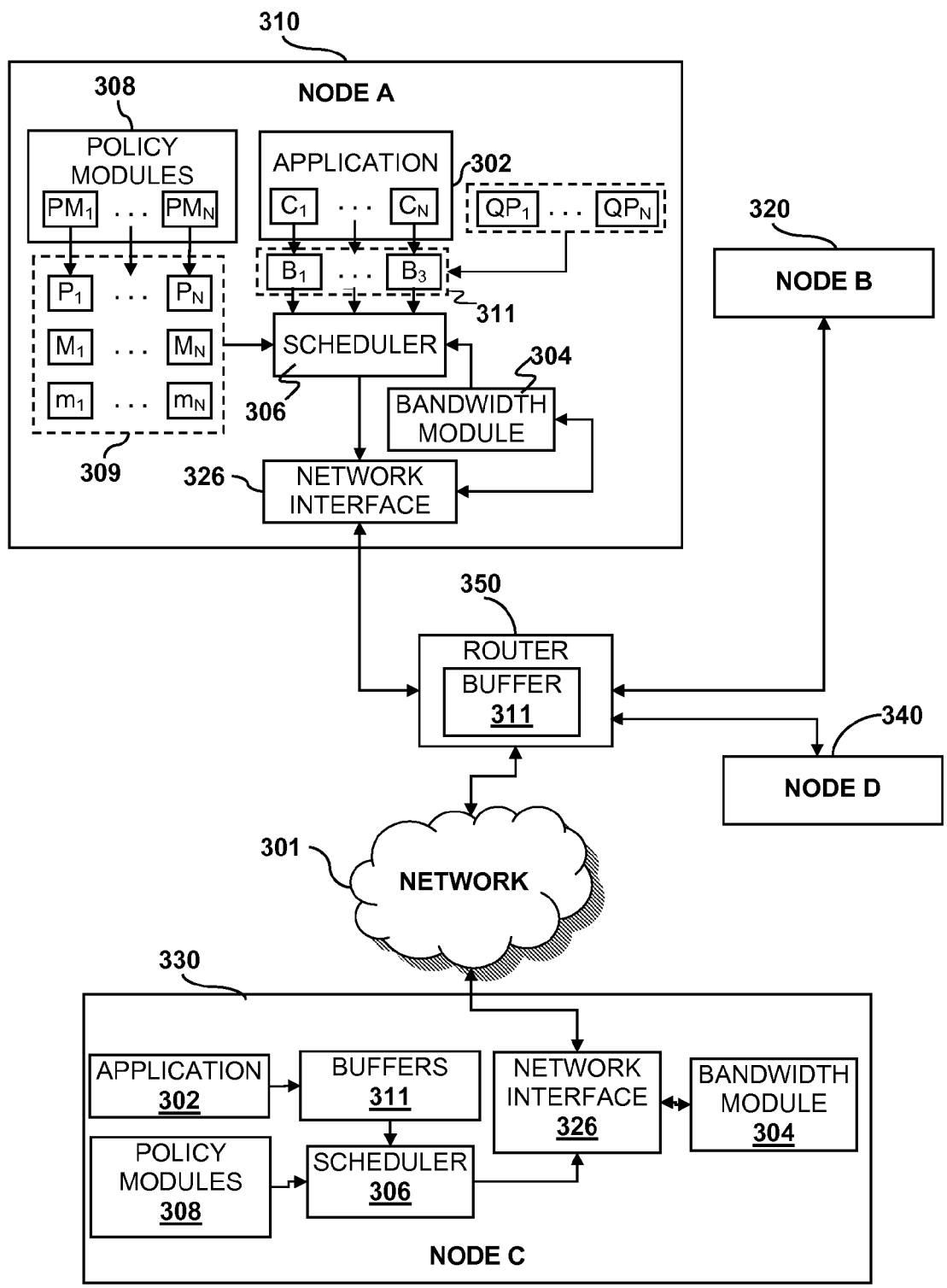
FIG. 3 is a block diagram of networked devices illustrating prioritization of network traffic according to an embodiment of the present invention.

According to certain embodiments of the present invention, bandwidth starvation issues may be avoided by prioritizing network traffic among distinct channels of communication within a single application. FIG. 3 depicts a flow diagram of a method 300 for prioritizing network traffic among two or more distinct channels of communication within a single application in a node configured to communicate with one or more other nodes over a network. Embodiments of the present invention may be understood by referring to FIG. 3 and FIG. 10.

As seen from FIG. 3, several nodes, e.g., Node A 310, Node B 320, Node C, 330 and Node D 340 may be configured to communicate over a network 301. Each node may include a network interface 326 to facilitate communication over the network 301. Two or more nodes, e.g., Node A 310 and Node B 320 may be behind a router 350. Two or more nodes may run an application 302 that allows the two nodes two communicate over two or more distinct channels $C_1 \ldots C_N$, where N is greater than or equal to 2. Each channel represents a different mode of communication of data traffic. The data for each mode communication may be formatted differently from that of the others. Examples of "channels" include, but are not limited to, audio streams, video streams, file transfer, drawing commands on a shared whiteboard, or any other bulk classification of data traffic. By way of example, and without loss of generality, the application 302 may be an audio-video (A/V) chat application involving audio, video and file transfer channels.

Each node 310, 320, 330, 340 may include a bandwidth module 304, which may be implemented in software or hardware. The bandwidth module 304 is responsible for estimating the available bandwidth for communication with the other nodes. For example, if Node A 310 is participating in audio video chat with Node C 330 and Node D 340, the bandwidth module estimates the available bandwidth Node A 310 has for communication with Node C 330 and Node D 340. Similarly, the bandwidth module 304 at Node C 330 may estimate the available bandwidth node C 330 has for communication with Node A 310 and Node D 340. In embodiments of the present invention, it is desirable to have accurate bandwidth estimates. A specific example of a bandwidth detection module is described in commonly assigned U.S. Provisional Patent Application 60/992,282, to Yutaka Takeda et al, entitled NETWORK BANDWIDTH DETECTION AND DISTRIBUTION.

Bandwidth Measurement

Figure 4:
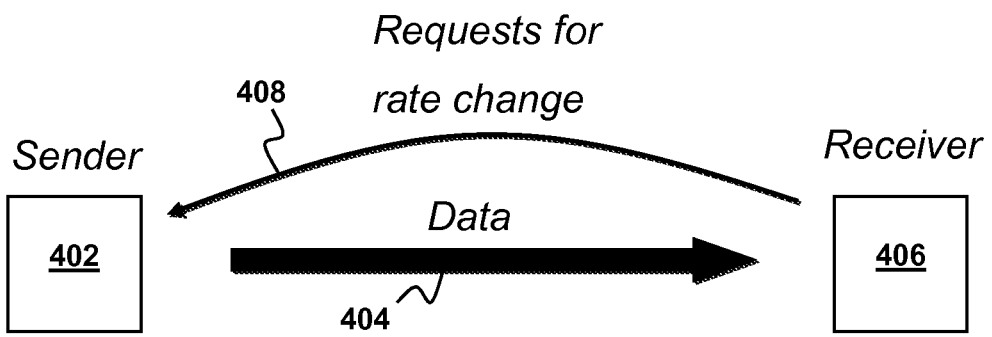
FIG. 4 is a schematic diagram of nodes connected via a network illustrating a "dumb sender" model for bandwidth measurement according to an embodiment of the present invention.

FIG. 4 illustrates an example of bandwidth measurement using a "Dumb Sender" model. According to this model a first node 402 sends traffic 404, e.g., one or more data packets, to a second remote node 406. The second node 406 detects a traffic status from analysis of the traffic 404 received from the first node 402. By way of example, each packet of the traffic 404 may include a timestamp and a sequence number along with application data so that the second node 406 can detect packet loss and propagation delay over the network. Based on the traffic status, the second node 406 may request that the sender send traffic at a specific rate based on the status. By way of example, the second node 406 may request the specific rate by sending a message packet 408 containing the specific rate to the first node 402. Once the first node 402 receives the specific rate from the second node 406, the first node 402 simply follows the request and transmits data at the requested rate.

The dumb sender model may be used to implement both the initial bandwidth measurement and the dynamic bandwidth measurement that are described below. In a "Dumb Sender" model of the type illustrated in FIG. 3, a receiver (e.g., the second node 406) knows in what state of measurement it is and is in full control of the sending rate of a sender (e.g., the first node 402), while the sender just follows instructions from the receiver.

Initial Bandwidth Measurement

Figure 5:
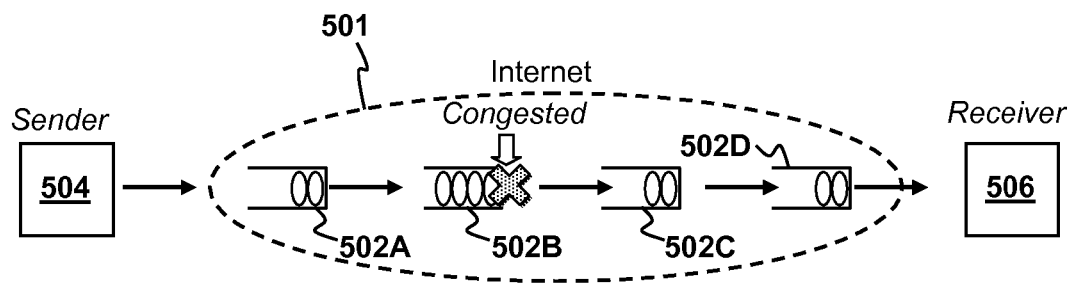
FIG. 5 is a schematic diagram of nodes connected via a network illustrating the issue of "flooding" in bandwidth determination according to embodiments of the present invention.

FIG. 5 illustrates the issue with "flooding". As seen in FIG. 4, a path 501 over a network may be regarded as a series of queues 502A, 502B, 502C, 502D. Each queue represents an accumulation of data packets at routers or switches on the path between a first node 504 and a second node 506. Packet loss may not occur on the path until one or more of the queues (e.g., the third queue 502C) become full. Flooding occurs when one or more of the queues receives more packets than they can handle. Such flooding may cause a large latency that may take long time to recover. It is therefore desirable for embodiments of the invention to take such latency growth into consideration when making an initial bandwidth measurement.

Figure 6:
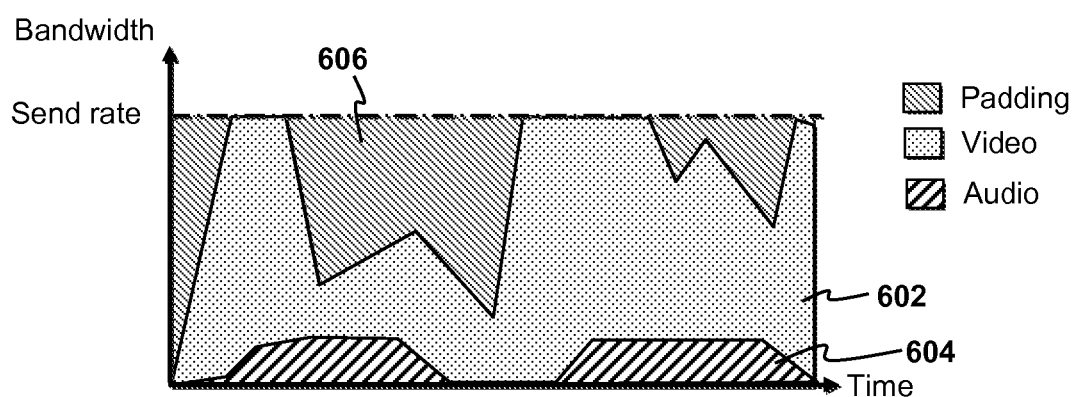
FIG. 6 is a graph of data transmission as a function of time illustrating bandwidth padding in conjunction with embodiments of the present invention.

The graph depicted in FIG. 6 illustrates the importance of "padding" bandwidth in embodiments of the present invention. Most media is of Variable Bit Rate (VBR). This means that the bit rate may vary over time due to the nature of the data being sent. For example, in MPEG Video data 602, the bit rate depends partly on the amount of movement taking place in a video frame. A greater amount of movement leads to a higher bit rate. In transmission of audio data 604, silence suppression may generate fewer packets or no packets at all during periods of silence. In order to accurately measure bandwidth, it is desirable to pad the data being sent with extra packets 606 so that a constant amount of data is transmitted per unit time during bandwidth measurement. The inventors have observed that without padding, the receiver starts allocating more bandwidth than the network can actually handle, and then when the video and audio data use up the full available bandwidth, growth of delay or packet loss (degradation of quality) occurs.

According to embodiments of the present invention, an initial bandwidth for a network path between two nodes may be determined as follows. First propose MTU discovery may be performed to determine the MTU for the network path. An example of path MTU discovery is described, e.g., as described in application Ser. No. 11/755,693. Once the network path MTU has been determined, data packets may be sent from the first node to the second node starting at some initial bandwidth value. The sending rate may then be gradually increased from the initial value by a fixed percentage at regular intervals of time until propagation delay is detected. The value of the sending rate when propagation delay is detected may then be used as the initial bandwidth value.

This so-called slow-start approach may begin with a sending rate set at some suitably low bandwidth value, e.g., 16 Kbps, 64 KKbps or 128 Kbps. The time needed for the sending rate to increase to a given bandwidth value depends partly on the initial and given bandwidth values, the interval between increases in the sending rate, and the percentage increase in sending rate for each interval. For example, Table I below shows a case where the given value is 280 Kbps, the sending rate is increased every second and various initial bandwidth values and percentage increases are assumed.

TABLE I

| Initial B/W→<br>Increase rate<br>↓ | 16 Kbps | 64 Kbps | 128 Kbps |
|---|---|---|---|
| +10% | 30 sec | 17 sec | 9 sec |
| +20% | 17 sec | 10 sec | 6 sec |
| +25% | 14 sec | 8 sec | 5 sec |
| +30% | 12 sec | 7 sec | 4 sec |

Given the foregoing discussion, the initial bandwidth measurement preferably satisfies certain requirements. Specifically, in the initial bandwidth measurement it is useful to detect growth of a propagation delay. If the propagation delay grows as the sending rate is increased, it may be deduced that a bandwidth saturation point has been exceeded. By way of example, propagation delay may be determined by a measurement of the amount of time a packet spends in transit over the network. By way of example, the sender may add a timestamp at the time of transmission to each packet so that the receiver can tell how much time the packet spent over the network by comparing the time of receipt of the packet and the timestamp field in the packet. To implement this, it is desirable for the sender's and receiver's "clocks" to be accurately synchronized. The clock synchronization may be done by a time synchronization protocol, such as Network Time Protocol (NTP). To implement such time synchronization, each client is synchronized with a NTP server. The operational details of NTP are described by David L. Mills in RFC 778, RFC 891, RFC 956, RFC 958, and RFC 1305, which may be accessed on the Internet at http://tools.ietf.org/html/rfc778, http://tools.ietf.org/html/rfc891, http://tools.ietf.org/html/rfc956, http://tools.ietf.org/html/rfc958 and http://tools.ietf.org/html/rfc1305 respectively and which are all incorporated herein by reference.

In some situations the accuracy of time determined by NTP may not be good enough to detect propagation delays of order 10 milliseconds. In such situations a peer-to-peer direct time synchronization may be implemented using a protocol similar to that of NTP, known as Simple Network Time Protocol (SNTP), which is described by David L. Mills in RFC 2030, which may be accessed on the Internet at http://tools.ietf.org/html/rfc2030, which is incorporated herein by reference. A local peer and a remote peer may perform a peer-to-peer time sync with each other using timestamps similar to those used in SNTP to calculate relative time differences. A timestamp generated by the remote peer may be converted to the local time with the calculated relative timestamp. By way of example a propagation delay may be determined from four timestamps $t_1, t_2, t_3, t_4$ where $t_1$ is the time the local node sent a message packet, $t_2$ is the time the remote node received the message packet, $t_3$ is the time the remote node sent a response to the message packet and $t_4$ is the time the local node received the response. The propagation delay $t_{PD}$ may be calculated as $$t_{PD}=((t_4-t_1)-(t_3-t_2))/2$$

Once the propagation delay is known, a time difference $t_{DIFF}$ may be calculated as $$t_{DIFF}=t_3+t_{PD}-t_4.$$

Once $t_{DIFF}$ is determined, the local node can calculate propagation delay $t_{PD}$ of subsequent each packet sent from the remote node using $t_{DIFF}$, a timestamp $t_S$ received from a remote peer and a locally generated time of receipt $t_R$. Specifically:

$$t_{PD}=t_R-(t_S+t_{DIFF}).$$

In addition, it is desirable that the initial bandwidth measurement avoid introducing an excessive amount of traffic to the network. Therefore a slow-start is desirable. It is also desirable to retry measurements at larger transmission unit (TU) sizes (e.g., 150% of the current TU size) at least a few times, e.g., up to two times, in order to improve the correctness of the measurement. What I meant by "larger" here is "the next TU size" 150% of the current TU size. Furthermore it is desirable that path MTU detection take place as quickly as possible, e.g., within about 30 seconds. It is generally not desirable to try too many times as the initial bandwidth measurement is desired to be completed in a short time (e.g., 30 sec as suggested here).

Path MTU Discovery

By way of example, discovery of the path MTU size may be implemented as explained below with respect to FIGS. 7A-7C. Path MTU discovery may be based on two observations. The first observation is that most routers will properly fragment packets that conform to certain Transport Layer protocols. An example of such a protocol is the User Datagram Protocol (UDP). UDP is a minimal message-oriented transport layer protocol that is described, e.g., by J. Postel in IETF RFC 768, Aug. 28, 1980, which may be accessed on the Internet at http://tools.ietf.org/html/rfc768, the contents of which are incorporated herein by reference. In the Internet protocol (IP) suite, UDP may provide a very simple interface between a network layer below (e.g., Ipv4) and a session layer or application layer above. UDP is often described as being a connectionless protocol. As used herein connectionless, refers to network protocols in which a host can send a message without establishing a connection with the recipient. That is, the host simply puts the message onto the network with the destination address and hopes that it arrives. Other examples of connectionless protocols include Ethernet and IPX. UDP is typically used for message broadcast (sending a message to all on a local network) or multicast (sending a message to all subscribers). Common network applications that use UDP include the Domain Name System (DNS), streaming media applications such as Internet Protocol Television (IPTV), Voice over IP (VoIP), Trivial File Transfer Protocol (TFTP) and online games.

The second observation is that routers tend to exhibit one or two particular types of bandwidth limitation behavior. Specifically, router bandwidth limitation may be classified as being either packet rate limited or bit rate limited. In a packet rate limited router, the data transmission rate is determined by a number of packets the router can transmit per unit time. For a packet rate limited router, the size of the packets does not affect the number of packets the router can send per unit time as long as the packets are no larger than some maximum packet size, which determines the MTU for that router. Packet rate limited routers are sometimes referred to herein as being packet-per-second (pps) limited. For a pps-limited router, it makes sense to send packets that are as large as possible in order to optimize the data transmission rate. For a bit rate limited router, by contrast, the data transmission rate is determined by a maximum number of bits per unit time that is independent of the packet size. Bit-rate limited routers are sometimes referred to herein as being bit-per-second (bps) limited. It is noted that both bps-limited routers and pps-limited routers may fragment a packet depending on the MTU set to the router.

Rate limitation, which may occur either intentionally or unintentionally, could happen at any layer in the protocol stack. One "intentional" case that is very common is to set up IP tables (set policies within the IP and transport layers) to throttle bandwidth. Bandwidth saturation may be detected at the receiver side by observing packet loss and increase of latency. As described above, there are a series of queues in the path. When saturation occurs somewhere in the path, a queue right before the saturation point starts accumulating packets. This may be observed as an "increase of latency" at the receiver by checking timestamps added to each packet. Eventually, the queue becomes full and packets start being dropped, which may also be observed at the receiver side by checking sequence numbers attached to each packet.

Figure 7A:
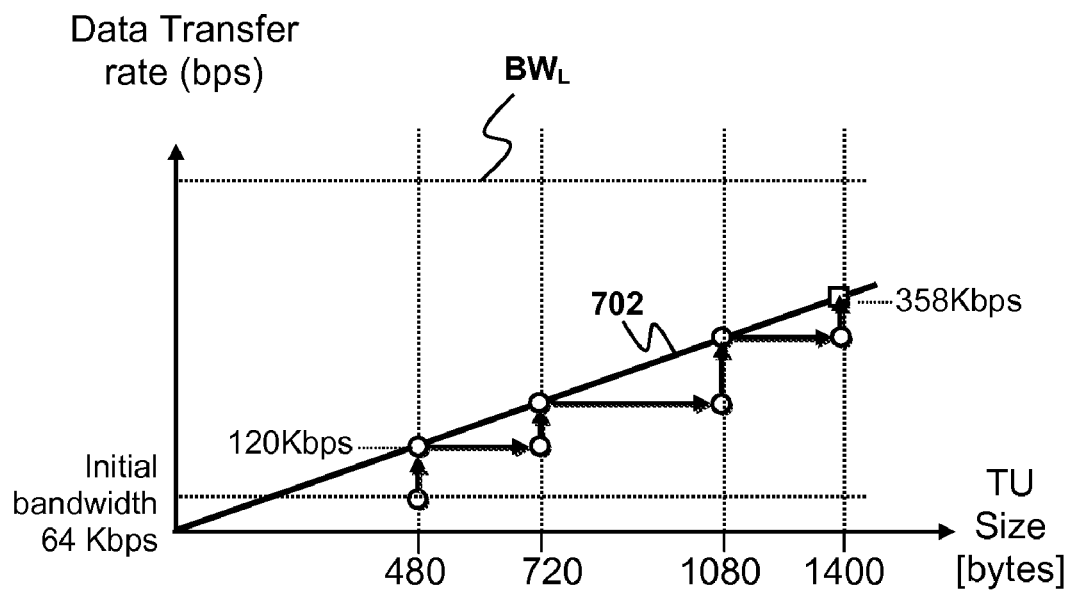
FIG. 7A is a graph illustrating the data transmission rate of a packet rate limited router as a function of packet size.
Figure 7B:
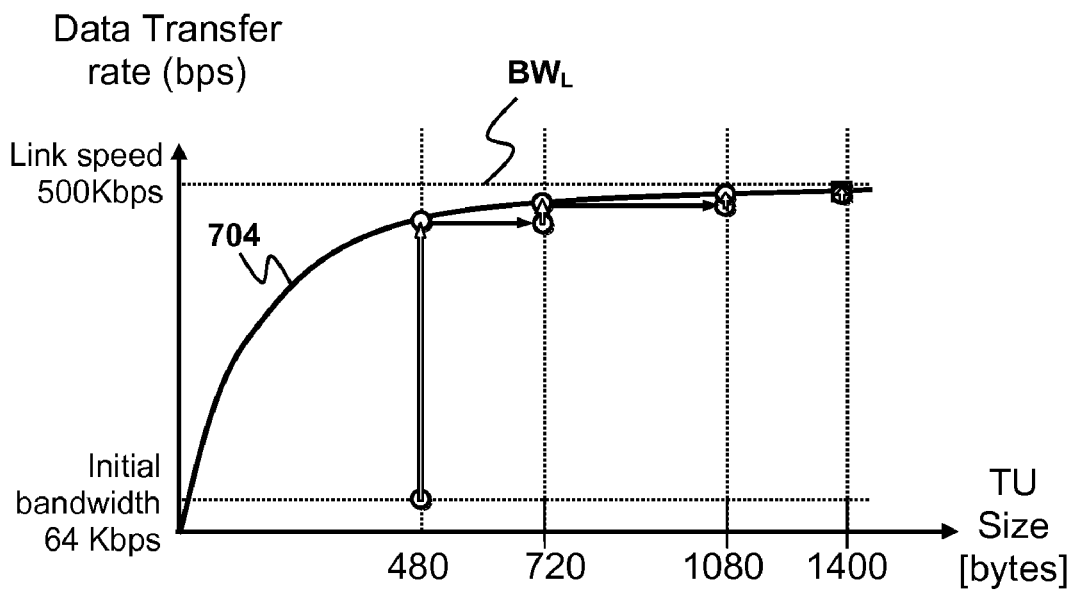
FIG. 7B is a graph illustrating the data transmission rate of a bit rate limited router as a function of packet size.

The difference in behavior of the packet rate limited and bit rate limited routers is illustrated in FIGS. 7A-7B. Specifically, FIG. 7A graphically depicts the data transfer rate for UDP packets as a function of transmission unit size TU for a packet rate limited router. In each case, the network path has a bandwidth limit of 500 Kilobits per second (Kbps). Packets at an initial size are sent at an initial bandwidth $BW_0$ (e.g., 64 Kbps). Preferably the sending host has the ability to "throttle" the bandwidth with which the packets are sent. The sending bandwidth may be gradually increased above the initial bandwidth $BW_0$, e.g., by a fixed percentage each second until bandwidth saturation is detected. Such a "slow-start" approach is often useful since packets are queued at each node. A long queue increases latency, which is undesirable. Long queues also tend to take a long time to be recovered. Embodiments of the present invention avoid this by gradually increasing the sending bandwidth BW while keeping the TU size fixed. Each packet includes a request for the receiving host to provide the data transfer rate (e.g., in bits per second (bps) for the received packets. As the bandwidth is increased, the data transfer rate for the received packets will continue to increase until the bandwidth reaches a point of saturation. At this point, increasing the bandwidth does not further increase the data transfer rate for the packets. Once saturation has been detected, the transmission unit size TU may then be increased, e.g., by some fixed percentage such as 50%, and the process may be repeated starting at an initial bandwidth approximately equal to the saturation bandwidth for the previous transmission unit size TU.

By observing the behavior of the bandwidth saturation as a function of TU size, the behavior of the network path between two nodes may be determined. For packets that are smaller than the router's MTU, the packet-limit saturated data transfer rate increases approximately linearly as the packet size increases as indicated by the lower dotted line 702 in FIG. 7A. For example, if the path contains a router having a packet limit of 32 packets per second and an initial packet size of, e.g., 480 8-bit bytes, the data transfer rate for the packets will saturate at about 120 Kbps. If the packet size is increased by 50%, e.g., to 720 bytes, but remains below the MTU size for the router, the bandwidth will saturate at about 180 Kbps. Such linear behavior is characteristic of a pps-limited router. Packets that are greater than the MTU size for the router are fragmented into two or more packets. As a result, the number of packets increases but the packet transmission rate does not. Consequently, the data transmission rate abruptly drops just beyond the MTU size. If the packet size is again increased, the data transmission rate for a pps-limited router is expected to increase in an approximately linear fashion until the packet size reaches another integer multiple of the MTU size. It is noted that even if the network path is packet-rate limited there is an upper limit on bandwidth saturation (e.g., 500 kbps) as indicated by the upper dotted line $BW_L$.

FIG. 7B graphically depicts the data transfer rate for UDP packets as a function of packet size for a bit rate limited router. It is noted that a bit rate limited router is generally not sensitive to fragmentation of the packets because it is not affected by the number of packets sent per second. For example, sending 1000 bytes/sec or 500 byte packets at 2 packets/sec is the same for a bit rate limited router. However, although the bandwidth may be more or less fixed for such a router, the data transfer rate (e.g., in bits per second) may vary due to a more or less constant latency associated with transmission of each packet. As a result of the latency, the data transfer rate for a bps-limited router will initially tend to increase sharply with packet size and indicated by the curve 704. However, as the data transmission rate approaches the bandwidth limit $BW_L$ for the network path, the transmission rate will tend to flatten off as a function of packet size.

Figure 7C:
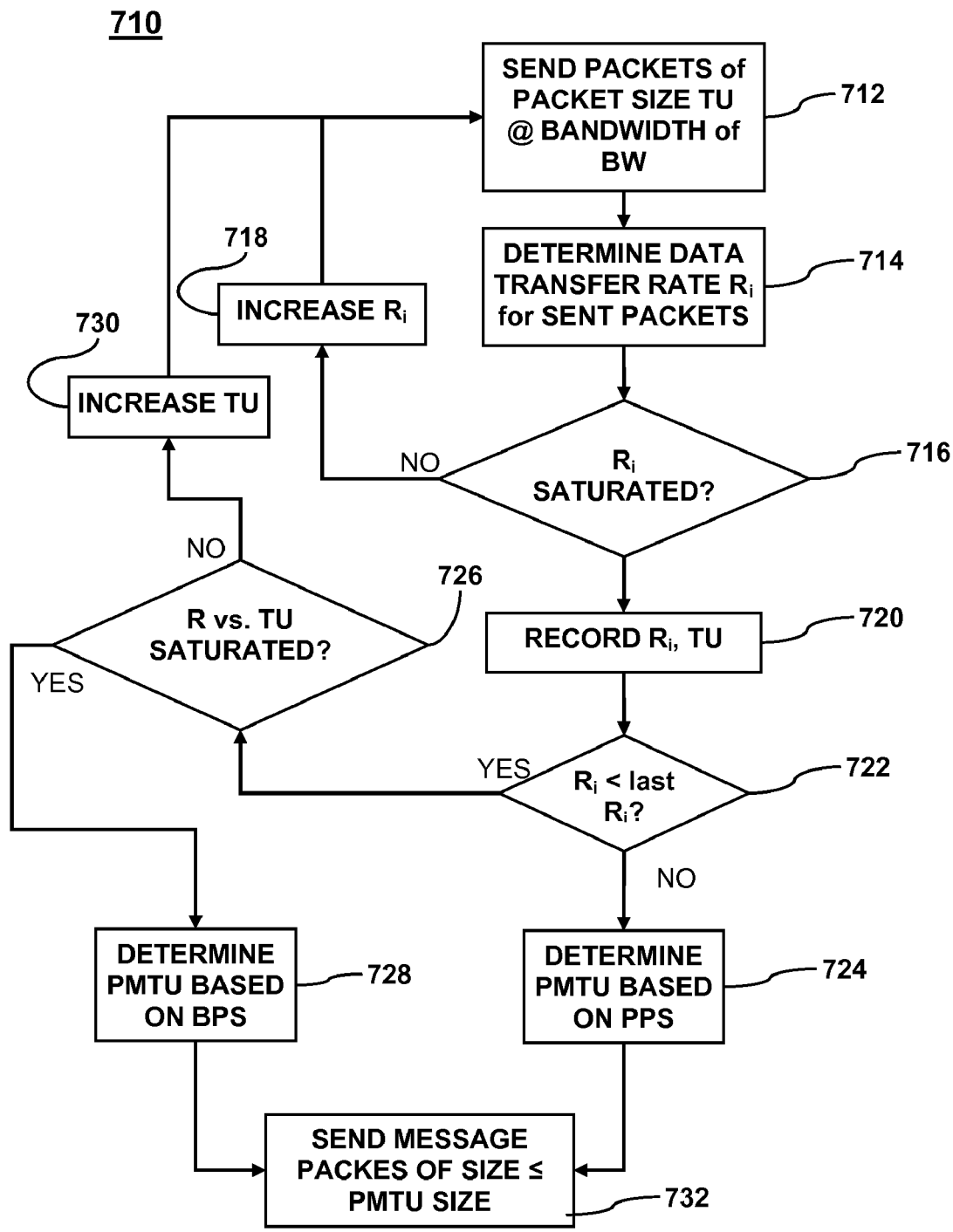
FIG. 7C is a flow diagram of a method for Path MTU discovery that may be used in conjunction with embodiments of the present invention.

Thus, based on an understanding of the two types of router behavior illustrated in FIGS. 7A-7B, path MTU discovery may proceed according to a method 710 as shown in FIG. 7C. As indicated at 712, test packets may be transmitted from one host to a recipient (e.g., from host 102 to host 104, with a small initial TU size and a small initial transmission bandwidth BW. (See FIG. 1). The DF flag for these packets is not set so that routers along the path 103 may fragment the packets normally, if they are configured to do so. As the packets are received, the transmitting host determines the data transfer rate for the packets, as indicated at 714. By way of example, each packet may include a request for the receiving host to send back a message that indicates the data transfer rate R for the test packet. The sending host probes for saturation behavior at 716. If saturation is not observed, the transmission bandwidth BW is gradually increased with the same TU size at 718, while probing packet loss and growth of delay at receiver side. When significant packet loss or growth of delay is detected, it may be assumed that the bandwidth with the TU size is saturated. The values of TU and R may be recorded at this point as indicated at 720. The TU size may then be increased, e.g., by 50% of the initial TU size. If the bandwidth is pps limited, it is expected that the bandwidth will grow linearly with TU size until the TU size (or an integer multiple thereof) is reached. If the TU size exceeds the actual path MTU size and the bandwidth is pps-limited, the receiver will detect that the data transfer rate is less than for the previous TU size. The example in FIG. 5A shows how the data transfer rate may behave when the TU size exceeds the actual path MTU size. When TU size exceeds the path MTU size, an intermediary node that has the MTU size set will start fragmenting long packets to fit them into the MTU size. This causes an increase in the number of packets, and a consequent decrease in the transfer rate since the bandwidth is pps limited. Specifically, just above the MTU size, the packets are split into two, which results in a drop in data transfer rate by one half. Just above twice the MTU size the packets are split into three, which results in a drop in data transfer rate by one third. Just above three times the MTU the packets are split into four, which results in a drop in data transfer rate by one fourth. By detecting this bandwidth drop, network applications can detect the path MTU size to maximize available bandwidth.

If the bandwidth is bps limited, by contrast, the bandwidth will tend to grow until it reaches a bandwidth saturation level, e.g., as shown and described above with respect to FIG. 7B. The data transfer rate for a bps-limited tends to flatten off without the characteristic drops seen in FIG. 7A. Thus, it is possible to determine router behavior and path MTU size by observing the dependence of data transfer rate R on TU size. By way of example, after each R and TU value has been recorded at 720 the sending host may check at 722 to determine if the latest value of R is less than the previous value of R. If so, the path MTU may be determined from the behavior of R versus TU at 724 based on a packet-rate limit assumption. If saturation of R as a function of TU (e.g., as shown in FIG. 7B) is detected at 726, the path MTU may be calculated based on a bit-rate limit assumption at 728. If such saturation behavior is not detected, the TU may be increased at 730 and the process may repeat at 712, 714, 716, etc. Once the Path MTU size has been determined, message packets of a size less than or equal to the Path MTU size may be sent over the path 103 to the second host 104, as indicated at 732. It is noted that the host that performs the path MTU discovery need not be one that sends the message packets. For example, if two or more hosts are connected to the second host 104 by the same path 103 it is possible for one of these hosts to perform path MTU discovery and notify another of these host of the path MTU. Any of these hosts may then send message packets that are less than or equal to the path MTU size over the path 103. Additional details of path MTU discovery are disclosed in commonly-assigned U.S. patent application Ser. No. 11/755, 693 to Yutaka Takeda, James Man, and Payton White entitled "NETWORK COMMUNICATION WITH PATH MTU SIZE DISCOVERY", which has been incorporated herein by reference.

It is noted that the total time to estimate the initial bandwidth (referred to herein as the "total seek time") may depend on whether the network path is packet rate limited or bit rate limited. Table II below illustrates an example of Total Seek Time Estimation for bandwidth limited and packet rate limited paths. In this example, it was assumed that the sending rate increased by 20% every second. Once saturation was reached for an in initial TU size, the TU size was increased as shown in Table II. The times shown in the table are the times for saturation for each TU size for the bit rate limited and packet rate limited cases.

TABLE II

| TU size → Rate type ↓ | 480 | 720 | 1080 | 1400 |
|---|---|---|---|---|
| Packet-limit | 5 sec | 4 sec | 3 sec | 3 sec |
| Byte-limit | 11 sec | 2 sec | 2 sec | 2 sec |

By adding up the saturation times it may be deduced that for the packet-rate limited case the Total Seek time is approximately 15 seconds and the Total Seek time for the bit rate limited case is approximately 17 seconds.

Dynamic Bandwidth Adjustment

Figure 8:
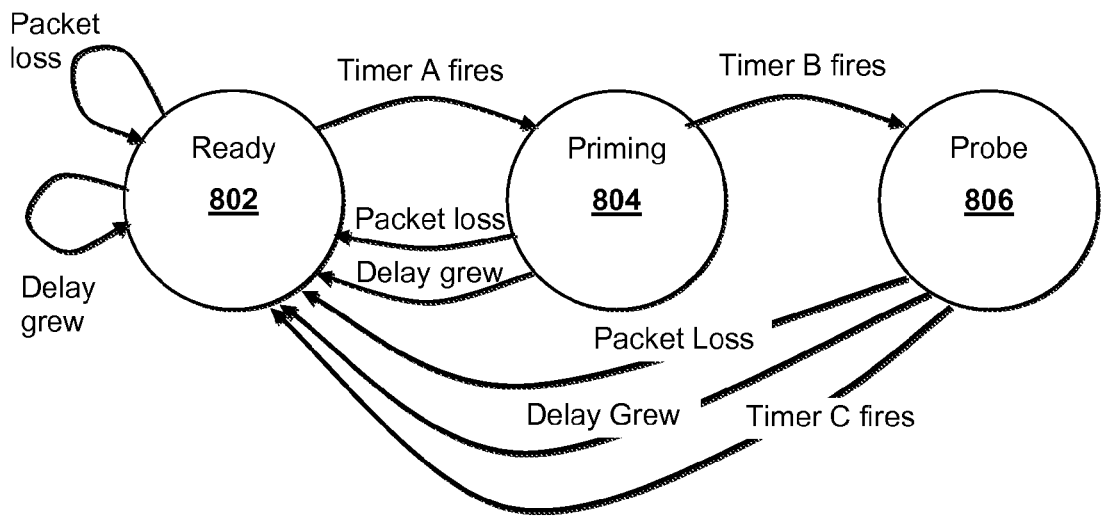
FIG. 8 is a schematic diagram of a network illustrating a computer software for implementing dynamic bandwidth adjusting according to an embodiment of the present invention.

According to embodiments of the present invention, bandwidth measurement may be utilized for dynamic bandwidth adjustment. By way of example, a node implementing dynamic bandwidth adjustment may be operated in one of three states. Specifically, as shown in FIG. 8 in a "Ready" state 802, the node sends data at an initial bandwidth rate without padding. If the node observes packet loss or growth in delay, the node may remain in the Ready state 802. If not, after a first predetermined time, e.g., as determined by a first timer A, the node may transition to a "Priming" state 804. In the Priming state 804 the node adds padding to data that it sends. If the node observes packet loss or growth in delay with the padded traffic, the node may return to the Ready state 802. Otherwise, after a second predetermined time, e.g., as determined by a second timer B, the node may transition to a "Probe" state 806. In the "Probe" state, the node may add padding while increasing a sending rate of the padded data. If the node observes packet loss or growth of delay in the padded traffic with increased sending rate, the node may return to the Ready state 802. Furthermore, even if packet loss or growth of delay are not observed, the node may return to the Ready state 802 after a third predetermined time, e.g., as determined by a third timer C. It is noted that the timers A, B, C may be implemented in hardware, in software, in firmware or some combination of two or more of hardware, software and firmware.

Figure 9:
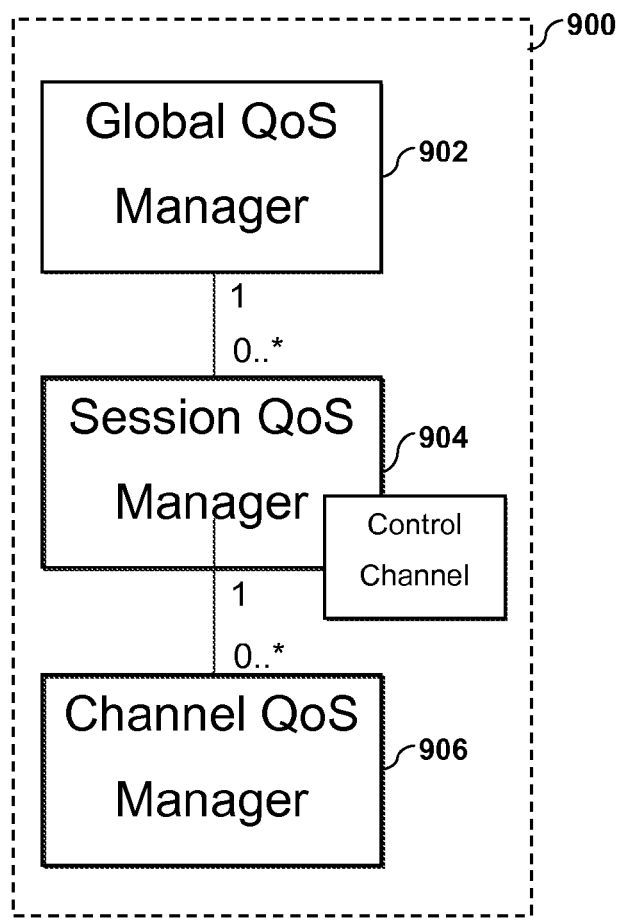
FIG. 9 is a block-level diagram illustrating a computer software for implementing global bandwidth management module in conjunction with embodiments of the present invention.

According to an embodiment of the invention, the node may be programmed to implement a three tier quality of service (QoS) bandwidth management module. By way of example, as shown in FIG. 9, a bandwidth management module 900 may include a Global QoS Manager 902, a Session QoS manager 904, and a Channel QoS manager 906. The Global QoS Manager 902 manages global bandwidth usage. The Global QoS Manager 902 may need to be aware of network topology as may be seen in the idea of a "Correlativity Index" with which the Global QoS 902 manager deals with network topology by looking at traffic characteristic dependencies between remote nodes. The Global QoS manager 902 is responsible for distributing bandwidth among different sessions running on the node 900.

The Session QoS Manager 904 is responsible for managing end-to-end QoS between the node on which it is implemented and one or more remote nodes. By way of example, and without limitation, the Session QoS manager 904 may be configured to perform MTU size discovery and rate limit type discovery, e.g., as set forth above with respect to FIGS. 6A-6C. The Channel QoS Manager 906 may be configured to implement media-specific policy controls for the node 900. Examples of such controls include fragmentation and/or de-fragmentation, queuing, scheduling, policy management and bandwidth usage management and bandwidth usage management. It is noted that in FIG. 9, the numbers 1, 0 . . . * between the Global QoS Manager 902 and the Session QoS Manager 904 and between the Session QoS Manager 904 and the Channel QoS Manager 906 indicate multiplicity of each end's component. For example, A Global QoS Manager 902 handles 0 or more Session QoS Managers 904, etc.

The Session QoS manager 904 may be configured to distribute available bandwidth among different communication channels for a given session. Such bandwidth distribution may be implemented, e.g., as described in commonly-assigned U.S. Provisional Patent Application 60/992,295 to James E. Marr, Yutaka Takeda, Attila Vass, Payton White and Stephen C. Detwiler entitled "NETWORK TRAFFIC PRIORITIZATION", filed the same day as the present application, which has been incorporated herein by reference. The Session QoS manager 904 may be configured to facilitate communication between the node 900 and one or more remote nodes.

Referring again to FIG. 3, network traffic prioritization may be implemented by a scheduler 306 running on one of the nodes, e.g., Node A 310. The scheduler 306 may be implemented in software, hardware, or some combination of software and hardware. By way of example, and without loss of generality, the scheduler 306 may be programmed with instructions that implement a method 1000 for prioritizing network traffic illustrated in FIG. 10.

Figure 10:
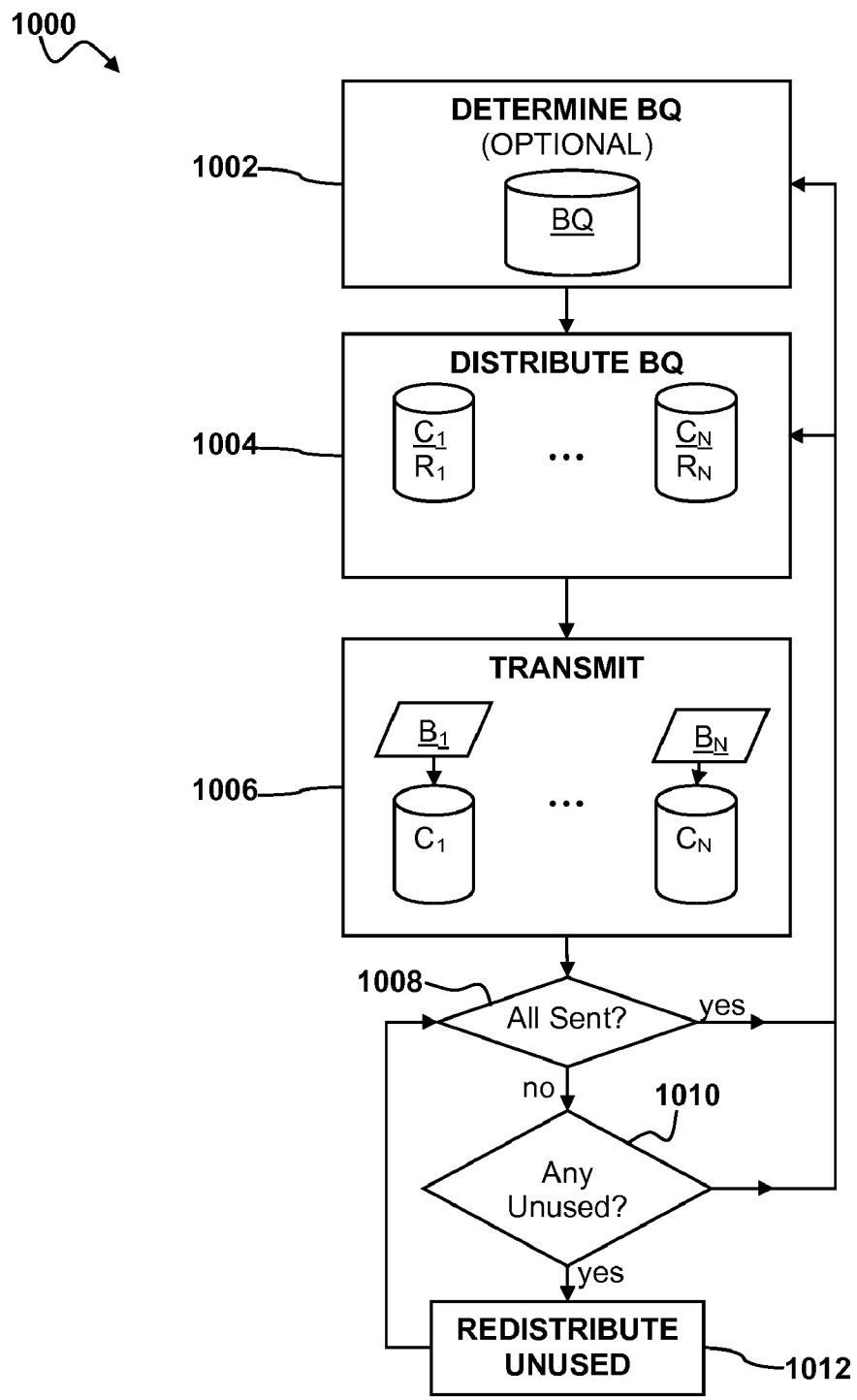
FIG. 10 is a flow diagram illustrating a method of for prioritizing network traffic according to an embodiment of the present invention.

As seen from FIG. 10, at 1002 a bandwidth quantum BQ may be determined for a given time interval referred to herein as a time quantum T. Although the choice of time quantum T is somewhat arbitrary, certain considerations are worth bearing in mind when choosing the size of the time quantum T. For example, a smaller time quantum will be more sensitive to isolated bandwidth changes. A longer time quantum will smooth sudden changes, but will result in the system taking longer to adjust to sudden, large changes. The bandwidth quantum BQ is a total amount of data (e.g., in kilobits (Kb)) that may be transmitted during the time quantum T. The bandwidth quantum BQ may be determined from a known or estimated bandwidth available for communication with a given node, e.g., as obtained from the bandwidth module 304. The bandwidth quantum BQ may be determined from an estimated bandwidth, e.g., in kilobits per second (Kbps) and the duration of the time quantum T. By way of example, the bandwidth quantum BQ may be determined from a product of a bandwidth estimate and the duration of the time quantum T. As a specific numerical example, suppose that the duration of the time quantum T is 50 milliseconds and the bandwidth module 304 in Node A 310 determines that 500 Kbps of bandwidth are available for communication between Node A 310 and Node C 330 and that 200 Kbps of bandwidth are available for communication between Node A 310 and Node D 340. The bandwidth quantum BQ for communication between Node A 310 and Node C 330 may be approximately (500 Kbps)(50 ms)=25 kilobits (Kb). Similarly, the bandwidth quantum BQ for communication between Node A 310 and Node C 340 may be approximately (200 Kbps)(50 ms)=10 kilobits (Kb).

The scheduler 306 may be configured to implement the distribution of the bandwidth quantum BQ amongst the available channels $C_1 \ldots C_N$. Referring again to FIG. 10, at 1004 the bandwidth quantum BQ is distributed amongst the communication channels $C_1 \ldots C_N$, based on priorities $P_1 \ldots P_N$ correspondingly assigned to the channels $C_1 \ldots C_N$. The channels are assigned corresponding reserved portions of the bandwidth quantum BQ. The size $R_i$ of the reserved portion assigned to a given channel $C_i$ of the N channels $C_1 \ldots C_N$, is greater than zero. The size $R_i$ may be determined based on the corresponding priority $P_i$ assigned to the given channel $C_i$. For example, the size $R_i$ of a given reserved portion may be determined by:

$$R_i = BQ \cdot \frac{P_i}{\sum_j P_j},$$

where $$\sum_j P_j$$

is a sum of the priorities $P_1 \ldots P_N$ for all of the channels $C_1 \ldots C_N$.

The quantity $$\frac{P_i}{\sum_j P_j}$$

is sometimes referred to herein as the relative priority $P_{rel}^i$ for channel $C_i$. The scheduler 306 may distribute the bandwidth quantum BQ according to priorities assigned by one or more policy modules 308. By way of example, the policy modules 308 may include individual policy modules $PM_1 \ldots PM_N$ for each of the communication channels $C_1 \ldots C_N$. The policy modules 308 may generate policy parameters 309 that the scheduler 306 uses to determine the distribution of the bandwidth quantum BQ amongst the channels $C_1 \ldots C_5$. The parameters 309 may include priorities $P_1 \ldots P_N$. The policy modules 308 may assign priorities $P_1 \ldots P_N$ based on the needs of the application 302. The priorities $P_1 \ldots P_N$ determine how the bandwidth quantum BQ is shared between the communication channels $C_1 \ldots C_N$. Such "bandwidth distribution" may be implemented at some fixed frequency (e.g., 50 Hz in some implementations) by the scheduler 306. At regular intervals, the scheduler 306 may obtain a bandwidth estimation from the bandwidth module 304, determine the bandwidth quantum BQ and divide the bandwidth quantum BQ between the communication channels $C_1 \ldots C_N$ based on their priorities $P_1 \ldots P_N$.

As a numerical example, assume the bandwidth module 304 estimates a bandwidth BW of 200 kbps for a certain connection. Further suppose that a software designer has configured the scheduler 306 to assign a priority $P_1=100$ to an audio channel $C_1$, a priority $P_2=20$ to a video channel $C_2$ and a priority $P_3=5$ to a file transfer channel $C_3$. If scheduler 306 is configured to trigger at 50 Hz, the time quantum T is approximately 20 milliseconds. By multiplying the estimated bandwidth BW by the time quantum T one obtains a bandwidth quantum BQ=200 Kbps×0.02 s=4 kb. From the priorities $P_1$, $P_2$ and $P_2$ of 100, 20 and 5 one may calculate relative priorities of $P_{rel}^1=100/125=0.8$, $P_{rel}^2=20/125=0.16$ and $P_{rel}^3=10/125=0.04$. Thus, for this distribution cycle, audio is assigned a portion $R_1=3.2$ Kb, video is assigned a portion $R_2=0.64$ Kb and file transfer is assigned a portion $R_3=0.16$ Kb.

The priorities $P_1 \ldots P_N$ may be assigned to the communication channels $C_1 \ldots C_N$ based on the nature and type of data being transmitted over the channels. For example, in the context of A/V chat, nature of streaming audio data may dictate that an audio channel be assigned a relatively high priority than streaming video data. Specifically, streaming audio tends to be relatively tolerant to packet loss. Streaming audio also tends to use a relatively constant amount of bandwidth (e.g., about 12 Kbps) compared to either video or file transfer. Streaming video data tends to use a relatively wide range of bandwidth, e.g., about 100-300 Kbps depending on compression, and is tolerant to packet loss. Streaming video tends to be less constant than audio. As a result, a streaming video channel may be assigned a lower priority than a streaming audio channel. File transfer data tends to be unpredictable and intermittent and uses as much bandwidth as is available. Unlike audio and video channels, a file transfer channel could theoretically use an infinite amount of bandwidth if it were available. File transfer data is intolerant to packet loss. File transfer data may be significantly less time insensitive than either video or audio data. Consequently, file transfer data channels may be assigned a significantly lower priority than streaming video channels. Furthermore, priorities may be assigned based on other considerations, e.g., economic considerations. For example, the data channels $C_1 \ldots C_N$ may include one or more channels devoted to advertising data. The priorities assigned to such advertising channels may be based partly on rates that advertisers are willing to pay to have their advertisements distributed by the nodes. Specifically, within the scheduler 306, selected ones of the priority modules $PM_1 \ldots PM_N$ associated with advertising channels may be configured to assign a higher priority if a higher advertising rate has been paid.

In addition to priorities, each policy module $PM_1 \ldots PM_N$ may determine maximum values $M_1 \ldots M_N$ and minimum values $m_1 \ldots m_N$ for the portions of the bandwidth quantum BQ that are corresponding assigned to channels $C_1 \ldots C_N$. Such maximum and minimum values may be regarded as a subset of the policy parameters 309. Generally, for a given channel $C_i$, $m_i < M_i$. Maximum and minimum values may be used to tailor the distribution of the bandwidth quantum BQ at 1004 to the needs of the application. The maximum and minimum values may have any suitable value. A given minimum value may be as low as zero. A given maximum may be infinite. In some cases, the scheduler 306 may initially assign a give channel $C_i$ a portion that has a size $R_i$ greater than its corresponding maximum value $M_i$. In such a case, the scheduler 306 may be configured, e.g., by suitable programming, to distribute the difference between $R_i$ and $M_i$ amongst the remaining channels. For example, if a channel $C_1$ has a maximum bandwidth portion $M_1$ of 5 Kb and its portion $R_1$ is 8.5 Kb. The difference, 8.5 Kb-5 Kb=3.5 Kb, may be distributed amongst the remaining channels, e.g., on a pro-rata basis dependent on relative priority. For example, suppose there are only two other channels $C_2$ and $C_3$ with relative priorities $P_2^{rel}=0.4$ and $P_3^{rel}=0.1$. The distributor 306 may split up the remaining 3.5 Kb as follows. Channel $C_2$ could be allocated an amount equal to $$3.5 \text{ Kb} \cdot \frac{0.4}{0.4 + 0.1} = 2.8 \text{ Kb}$$

in addition to its regular portion $R_2$ of the bandwidth quantum BQ. Similarly, channel $C_3$ could be allocated $$3.5 \text{ Kb} \cdot \frac{0.1}{0.4 + 0.1} = 0.7 \text{ Kb}$$

in addition to its regular portion $R_3$ of the bandwidth quantum BQ.

If a given communication channel $C_i$ has a minimum bandwidth quantum portion $m_i$, all channels of a lower priority that $C_i$ may be excluded from bandwidth distribution at 1004 during the time quantum T until a minimum amount of data $m_i$ has been transmitted by the channel $C_i$. If more than one channel has a minimum, the bandwidth quantum is initially distributed to the highest priority channel with a minimum and any other channels having a higher priority. It is important to select the minimum values $m_1 \ldots m_N$ carefully in order to avoid bandwidth starvation. The minimum amount of data $m_i$ represents a minimum amount of data to be sent by the channel $C_i$ during the time quantum T. The minimum value may also be thought of as an expected minimum size of data to send. It is possible that the provided minimum value may be a best guess, and more or less data could actually be available to send. For example, a channel for audio data may always use close to 12 Kbps, so 12 Kbps may be set as the minimum value $m_i$ for that channel. However, depending on the compression used, the actual amount of data may be slightly below 12 Kbps at times or slightly over 12 kbps.

Furthermore the policy modules $PM_1 \ldots PM_N$ may generate parameters associated with queuing policies $QP_1 \ldots QP_N$ to the channels $C_1 \ldots C_N$. Each queuing policy determines what happens when multiple sends (e.g., data units such as packets or frames) are made on a single channel, but cannot all be sent immediately. A given queuing policy $QP_i$ may be matched by a software designer to the type of data being sent through the corresponding channel $C_i$. The nature of the queuing policy $QP_i$ may depend on the nature of the data being sent over the channel $C_i$. For example, real time streaming data, e.g., streaming audio or video, may have different requirements than non-streaming data. In the case of video channel $C_2$, two or more video frames may be captured from a camera at different times. Due to the real-time nature of streaming video data, an older frame may be useless and could be discarded in favor of a newer frame. Thus the video channel $C_2$ may use a queuing policy that selectively discards older images in favor of the newer images. A similar policy may be implemented for the audio channel $C_1$. For the file transfer channel $C_3$, by contrast, it may be more desirable to transmit every packet regardless of age. Consequently, the filer transfer channel $C_3$ may have a different queuing policy attached it. By way of example, the file transfer channel may have a queuing policy that buffers all packets that cannot be sent during the time quantum T.

Each channel $C_i$ may utilize the bandwidth portion $R_i$ that was assigned to it during the time quantum T. Referring again to FIG. 10, at 1006 ready data may be transmitted for each channel $C_i$ that has any ready data to transmit. The amount of ready data transmitted at 1006 for a given channel $C_i$ is generally greater than zero and less than or equal to the size $R_i$ of the reserved portion for the channel $C_i$. As used herein the term "ready data" refers to data that is available for transmission. Ready data may be available for transmission by virtue of being generated by the application. In some cases, such ready data may be transmitted during the time quantum T as soon as it is generated. In addition, ready data may be available by virtue of being stored in one or more buffers 311. Generally, the buffers 311 may include N communication channel buffers $B_1 \ldots B_N$ correspondingly associated with communication channels $C_1 \ldots C_N$. In some embodiments, the router 350 may include buffers 311. As used herein, the term buffer generally refers to a region of computer memory used to temporarily hold data while it is being moved from one place to another. Buffers are used, e.g., when there is a difference between the rate at which data is received and the rate at which it can be processed, or in the case that these rates are variable. Typically, the data is stored in a buffer as it is retrieved from a source of the data (e.g., an input device or program generating the data) or just before it is sent to an output device (e.g., a network interface). In addition, a buffer may be used when moving data between processes within a computer. By way of example, each communication channel buffer may be implemented in hardware, software or some combination of both hardware and software. By way of example, and without limitation, the communication buffers $B_1, \ldots B_N$, may be implemented in software.

If a given channel $C_i$ does not use its entire reserved portion $R_i$ during the time quantum T, any unused part of the reserved portion $R_i$ may be redistributed to the other channels. By way of example, If not all of the ready data has been sent at 1008 the scheduler 306 may determine at 1010 whether there is any unused reserved portion $R_i$ to redistribute. If there is both unsent data and one or more unused reserved portions of the bandwidth quantum, then at 1012 any unused part of any reserved portion $R_i$ may be redistributed amongst any of the N communication channels $C_1 \ldots C_N$ having un-transmitted ready data. Such redistribution may take place on a pro-rata basis based on relative priority. This sequence may repeat until all ready data has been sent or there is no unused portion of the bandwidth quantum BQ. Otherwise, the cycle may begin again, e.g., at normal distribution at 1004 or (optionally) determination of a new bandwidth quantum BQ at 1002. The cycle may then return repeat continually.

It is noted that the beginning and end of the cycle are somewhat arbitrary. For example, although from FIG. 10 it would appear that redistribution 1012 takes place at the end of the time quantum T, redistribution may alternatively take place at the beginning of the time quantum T. Generally, redistribution may take place at some time after normal distribution and transmission in one time quantum and before normal distribution in the next time quantum.

Figure 11:
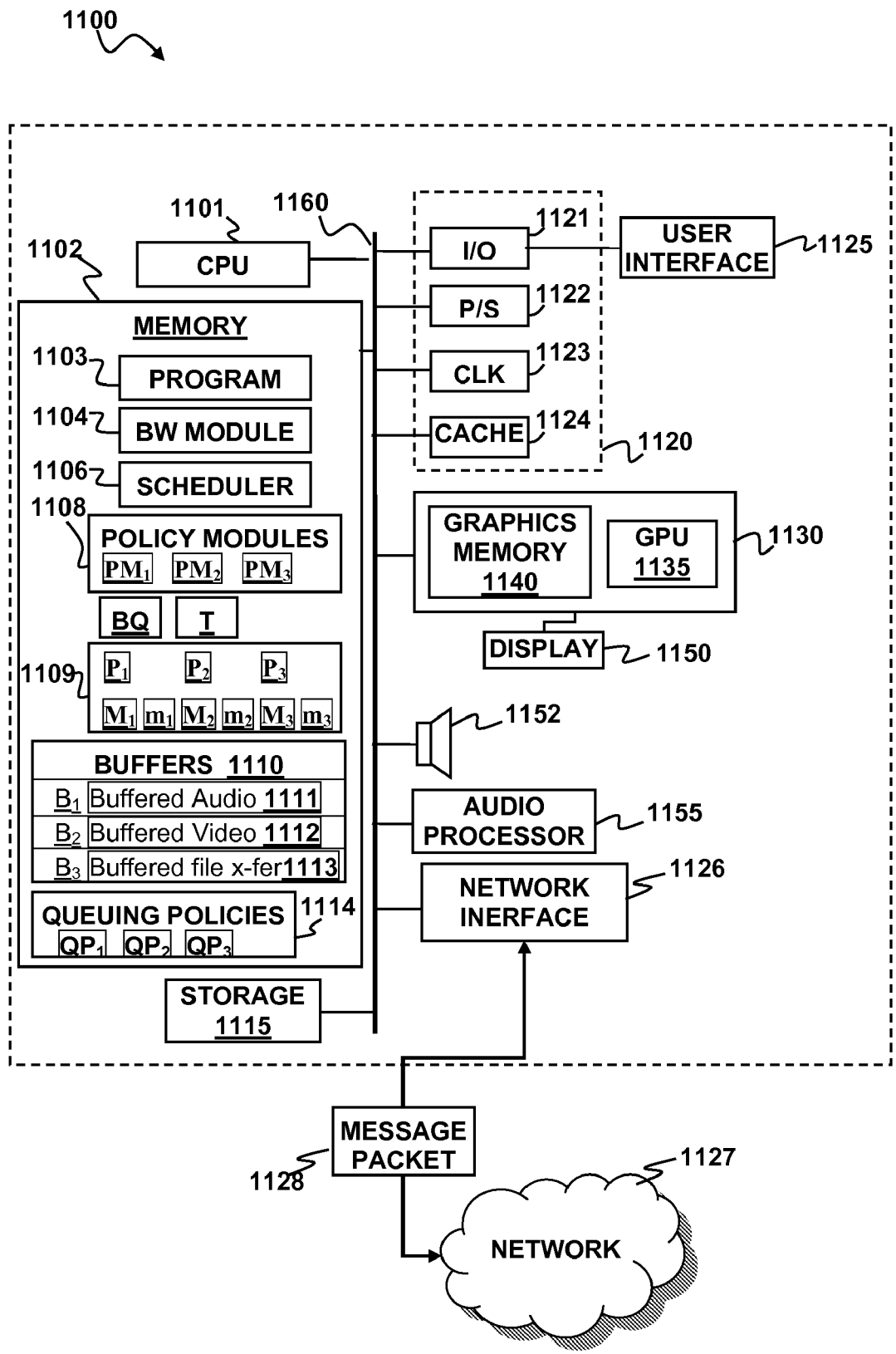
FIG. 11 is a block diagram of a node configured to implement network traffic prioritization according to an embodiment of the present invention.

FIG. 11 is a block diagram illustrating the components of a node 1100 suitable for implementing network traffic prioritization according to an embodiment of the present invention. By way of example, and without loss of generality, the node 1100 may be implemented as a computer system, such as a personal computer, video game console, personal digital assistant, or other digital device, suitable for practicing an embodiment of the invention. The node 1100 may include a central processing unit (CPU) 1101 configured to run software applications and optionally an operating system. The CPU 1101 may include one or more processing cores. By way of example and without limitation, the CPU 1101 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In the node 1100 a memory 1102 may be coupled to the CPU 1101. The memory 1102 may store applications and data for use by the CPU 1101. The memory 1102 may be in the form of an integrated circuit, e.g., RAM, DRAM, ROM, and the like). A computer program 1103 may be stored in the memory 1102 in the form of instructions that can be executed on the processor 1101. The instructions of the program 1103 may be configured to implement, amongst other things, one or more applications, such as the application 302 described above with respect to FIG. 3. By way of example, and without loss of generality, the program 1103 may include an application, such as an A/V chat application involving two or more channels of communication. Such channels may include, but are not limited to an audio channel $C_1$, a video channel $C_2$ and a file transfer channel $C_3$. The memory 1102 may also contain instructions, that, when executed by the CPU 1101 implement a bandwidth module 1104 having features in common with the bandwidth module 304 described above. The memory 1102 may also contain instructions configured to implement a scheduler 1106 having features in common with the scheduler 306 described above. The memory 1102 may also contain instructions configured to implement one or more policy modules 1108 having features in common with the policy modules 308 described above. By way of example and without loss of generality, the policy modules 1108 may include an audio policy module $PM_1$ for the audio channel $C_1$, a video policy module $PM_2$ for the video channel $C_2$, and a file transfer policy $PM_3$ for the file transfer channel $C_3$.

The memory 1102 may contain data that is generated by or usable by the program 1103, bandwidth module 1104, scheduler 1106, and policy modules 1108. Specifically, such data may include, but is not limited to policy module parameters 1109, a bandwidth quantum BQ and a time quantum T. The policy module parameters 1109 may include priorities $P_1$, $P_2$, and $P_3$ respectively associated with the audio channel $C_1$, video channel $C_2$, and file transfer channel $C_3$. The policy module parameters 1109 may further include minimum values $m_1$, $m_2$ and $m_3$ respectively associated with the audio channel $C_1$, video channel $C_2$ and file transfer channel $C_3$ as well as maximum values $M_1$, $M_2$ and $M_3$ respectively associated with the audio channel $C_1$, video channel $C_2$ and file transfer channel $C_3$.

In addition, the memory 1102 may be configured to include one or more buffers 1110 for data generated by the program 1103 for transmission via the communication channels. By way of example and without loss of generality, the buffers 1110 may include an audio buffer $B_1$ configured to buffer audio channel data 1111, a video buffer $B_2$ configured to buffer video channel data 1112 and a file transfer buffer $B_3$ configured to buffer file transfer channel data 1113. The scheduler 1106 may be configured, e.g., by appropriate programming, to implement buffering of data in accordance with one or more queuing policies 1114. By way of example, and without loss of generality, the queuing policies 1114 may include an audio data queuing policy $QP_1$, a video data queuing policy $QP_2$ and a file transfer queuing policy $QP_3$. The queuing policies 1114 may be configured, to determine what happens when multiple sends are made on a single channel, but cannot all be sent immediately, e.g., as described above.

The node 1100 may further include a storage device 1115 that provides non-volatile storage for applications and data. By way of example, the storage device 1115 may be a fixed disk drive, removable disk drive, flash memory device, tape drive, CD-ROM, DVD-ROM, Blu-ray, HD-DVD, UMD, or other optical storage devices. The node 1100 may also include well-known support functions 1120 commonly used in computing systems. Such support functions may include such features as input/output (I/O) elements 1121, power supplies (P/S) 1122, a clock (CLK) 1123 and cache 1124.

One or more user input devices 1125 may be used to communicate user inputs from one or more users to the node 1100. By way of example, one or more of the user input devices 1125 may be coupled to the node 1100 via the I/O elements 1121. Examples of suitable input devices 1125 include keyboards, mice, joysticks, touch pads, touch screens, light pens, still or video cameras, and/or microphones. In the particular case of A/V chat, it is desirable for the user interface devices 1125 to include both a camera and a microphone. A network interface 1126 allows the node 1100 to communicate with other computer systems via an electronic communications network 1127. The network interface 1126 may include wired or wireless communication over local area networks and wide area networks such as the Internet. The node 1100 may send and receive data and/or requests for files via one or more message packets 1128 over the network 1127.

The node 1100 may further comprise a graphics subsystem 1130, which may include a graphics processing unit (GPU) 1135 and graphics memory 1140. The graphics memory 1140 may include a display memory (e.g., a frame buffer) used for storing pixel data for each pixel of an output image. The graphics memory 1140 may be integrated in the same device as the GPU 1135, connected as a separate device with GPU 1135, and/or implemented within the memory 1102. Pixel data may be provided to the graphics memory 1140 directly from the CPU 1101. Alternatively, the CPU 1101 may provide the GPU 1135 with data and/or instructions defining the desired output images, from which the GPU 1135 may generate the pixel data of one or more output images. The data and/or instructions defining the desired output images may be stored in memory 1110 and/or graphics memory 1140. In an embodiment, the GPU 1135 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 1135 may further include one or more programmable execution units capable of executing shader programs.

The graphics subsystem 1130 may periodically output pixel data for an image from graphics memory 1140 to be displayed on a display device 1150. The display device 1150 may be any device capable of displaying visual information in response to a signal from the computer system 1100, including CRT, LCD, plasma, and OLED displays. The node 1100 may provide the display device 1150 with an analog or digital signal. By way of example, the display 1150 may include a cathode ray tube (CRT) or flat panel screen that displays text, numerals, graphical symbols, or images. In addition, the node 1100 may include one or more audio speakers 1152 that produce audible or otherwise detectable sounds. To facilitate generation of such sounds, the node 1100 may further include an audio processor 1155 adapted to generate analog or digital audio output from instructions and/or data provided by the CPU 1101, memory 1102, and/or storage 1115. In the particular case of A/V chat, it is desirable for the node 1100 to include a graphical display device 1150 and an audio speaker 1152.

The components of the node 1100, including the CPU 1101, memory 1102, support functions 1120, data storage 1115, user input devices 1125, network interface 1126, graphics subsystem 1130, speaker 1152 and audio processor 1155 may be operably connected to each other via one or more data buses 1160. These components may be implemented in hardware, software, firmware or some combination of two or more of these.

By way of example, and without loss of generality, software designers may implement embodiments of the present invention in software applications by creating a plurality of communication channels, and assigning a priority and a queuing policy to each one. Data could then be sent through these configured communication channels and the scheduler 1106, policy modules 1108, and queuing policies 1114 may control the actual transmission of the data over the network 1127.

Figure 12:
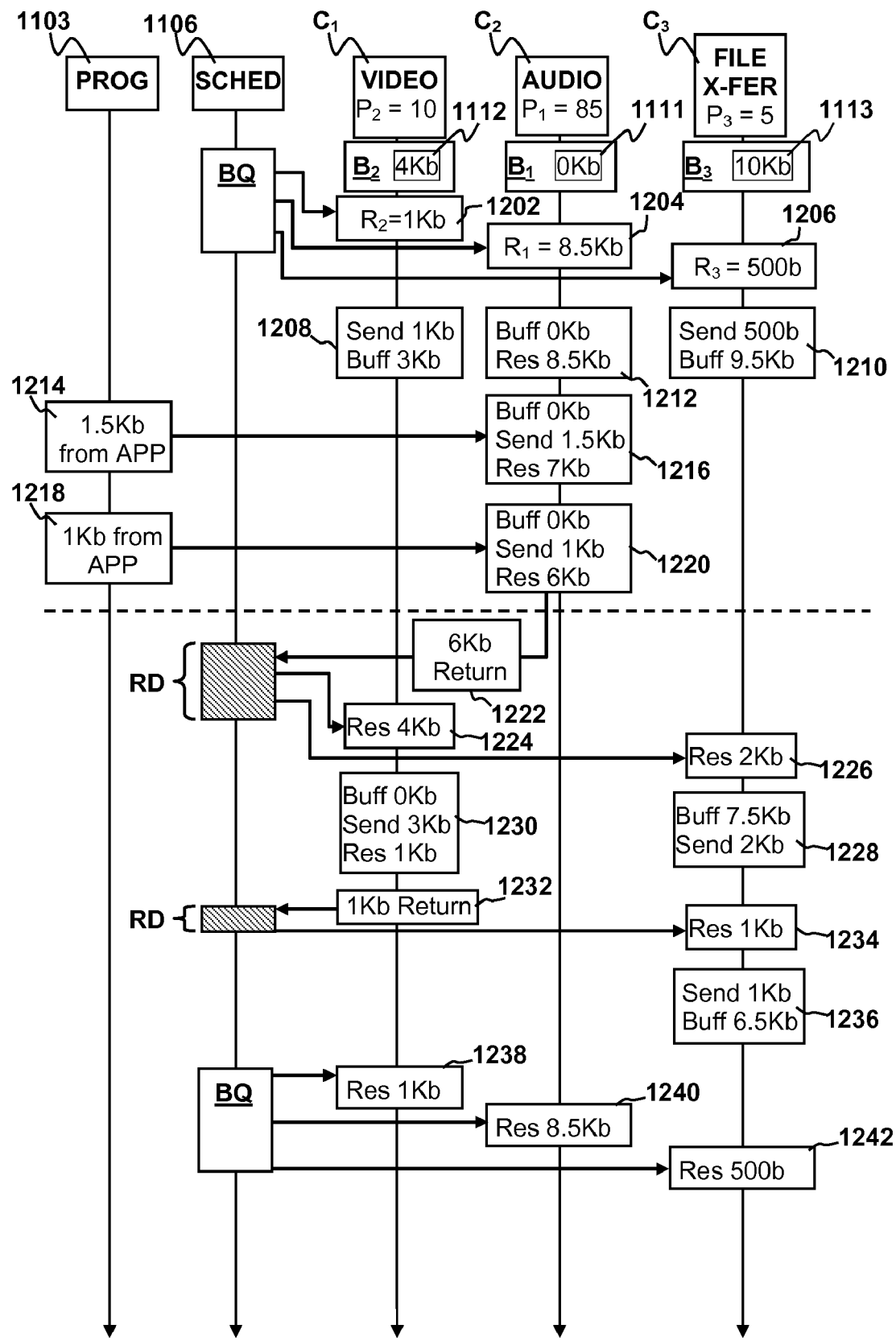
FIG. 12 is a flow diagram illustrating a particular example of prioritizing network traffic amongst audio, video and file transfer channels in a node of the type shown in FIG. 3 according to an embodiment of the present invention.

FIG. 12 illustrates an example of operation of the operation of a node of the type shown in FIG. 11. In the example illustrated in FIG. 12 it is assumed, for the purpose of example, that the audio buffer $B_1$ contains no buffered audio data 1111, the video buffer $B_2$ contains 4 Kb of buffered video data 1112 and the file transfer buffer $B_3$ contains 10 Kb of buffered data 1113 for file transfer. It is also assumed, for the sake of simplicity, that there is no unreserved bandwidth quantum at the beginning of a time quantum T1. In this example, the audio channel $C_1$ has been assigned a priority value $P_1=85$, the video channel $C_2$ has been assigned a priority value $P_2=10$ and the file transfer channel $C_3$ has been assigned a priority value $P_3=5$. It is assumed in FIG. 4, that the size of the available bandwidth for one or more 20 millisecond time quanta has been determined by the bandwidth module 1104 to be 500 Kbps. The scheduler 1106, therefore determines that the corresponding bandwidth quantum is 10 Kb. Using the formula described above, the scheduler 1106 may calculate relative priorities $P_{rel}^1=0.85$, $P_{rel}^2=0.10$ and $P_{rel}^3=0.05$ for the audio channel $C_1$, video channel $C_2$ and file transfer channel $C_3$, respectively. In accordance with the formula $R_i=(P_{rel}^i)(BQ)$, the scheduler 1106 may then reserve portions of the bandwidth quantum BQ of $R_2=1$ Kb for the video channel $C_2$, $R_1=8.5$ Kb for the audio channel $C_1$ and $R_3=500$ b for the file transfer channel $C_2$ as indicated at 1202, 1204 and 1206 respectively. The scheduler 1106 may then cause the node 1100 to send 1 Kb of the buffered video data 1112 and buffer the remaining 3 Kb as indicated at 1208. Similarly, the scheduler 1106 may then cause the node 1100 to send 500 b of the buffered file transfer data 1113 and buffer the remaining 9.5 Kb as indicated at 1210. If no audio data is available, the scheduler 1106 may continue to reserve 8.5 Kb for the audio channel $C_3$ as indicated at 1212. At some later point during the time quantum T1 the program 1103 may generate 1.5 Kb of audio data for the audio channel $C_1$ as indicated at 1214. This data may be sent over the audio channel $C_1$ while reserving the remaining (8.5 Kb-1.5 Kb)=7 Kb as indicated at 1216. At some further point in the time quantum T1 an additional 1 Kb of audio data may be generated by the program 1103 as indicated at 1218. This data may be sent over the audio channel $C_1$ while reserving (7 Kb-1 Kb)=7 Kb as indicated at 1220.

At some point the time quantum T1 ends and a new time quantum T2 begins. In this example, 6 Kb remains from the reserved portions $R_1$, $R_2$, $R_3$ of the bandwidth quantum BQ. This remaining portion may be returned for redistribution at the beginning of the new time quantum T2 as indicated at 1222. The 6 Kb of returned reserved portion provides a redistribution quantum RD that may be distributed on a pro-rata basis amongst any of the channels $C_1$, $C_2$ $C_3$ having un-transmitted ready data, e.g., buffered data.

In this example, the video channel $C_2$ has 3 Kb of buffered data and the file transfer channel $C_3$ has 9.5 Kb of buffered data at the beginning of the new time quantum T2. Since the audio channel $C_1$ has no buffered data at this point, the 6 Kb of unused reserved portion is distributed between the video channel $C_2$ and the file transfer channel $C_3$. In this example, the priority $P_2$ for the video channel $C_2$ is twice as large as the priority for the file transfer channel $C_3$. The scheduler 1106 may therefore reserve 4 Kb of the redistribution quantum RD for the video channel $C_2$ as indicated at 1224 and 2 Kb of the redistribution quantum RD for the file transfer channel $C_3$ as indicated at 1226. The scheduler 1106 may then cause the node 1100 to send 2 Kb of buffered file transfer data 1113 as indicated at 1228. The remaining 3 Kb of buffered video data 1112 may be sent and the leftover 1 Kb reserved as indicated at 1230. The leftover 1 Kb may be returned to the redistribution quantum RD as indicated at 1232. Since, at this point, only the file transfer channel $C_3$ has buffered data, the entire 1 Kb of the redistribution quantum RD may be reserved for the file transfer channel $C_3$ as indicated at 1234. The scheduler 1106 may then cause the node 1100 to send 1 Kb of buffered file transfer data 1113 while buffering the remaining 6.5 Kb as indicated at 1236.

At this point in this example, the entire bandwidth quantum BQ has been used and normal distribution may take place for the new time quantum T2. For example, if the sizes of the time quantum and available bandwidth are the same as before, 1 Kb may be reserved for the video channel $C_2$ at 1238, 8.5 Kb may be reserved for the audio channel $C_1$ at 1240 and 500b may be reserved for the file transfer channel $C_3$ at 1242. The reserved portions $R_1$, $R_2$, and $R_3$ may be used during the remainder of the new time quantum T2 in a manner similar to that described above with respect to the previous time quantum T2. Any unused reserved portions may be redistributed at the beginning of a subsequent time quantum.

Although the discussion of FIG. 12 is directed to an example involving three specific communication channels, those of skill in the art will recognize that the concept illustrated in that example may be applied to two channels or more than three channels in any similarly configured node.

As an example of Global Bandwidth Management, consider a shared bandwidth situation in which bandwidth available for one session grows while bandwidth available for another session is shrinking. The available bandwidth may be dedicated. In such a situation it is useful to detect correlativity between the bandwidth dedication and the session. It is therefore desirable to detect such correlativity. "Session" information, such as whether a session involves a direct connection or via a proxy server or a relay server, is not useful because bottle necks may be present at locations other than a proxy or a relay server, (e.g., an ADSL uplink.) Furthermore, it is also desirable to address outgoing bandwidth distribution. Existing bandwidth measurement schemes, however, only determine inbound bandwidth saturation.

According to an alternative Bandwidth Correlativity may be detected for communication over a network between a "local" node and a "target" node utilizing three traffic states: a Ready state, a Priming state and a Probing state. In the Ready state, a node may send variable bit rate traffic at current sending rate. In the Priming state the node may add padding and send padded data at a constant bit rate with the current sending rate. In the Probing state, the node may send padded data at a constant bit rate with an increased sending rate. The correlativity detection may proceed as follows. Initially, all nodes within a group of nodes may start sending padded traffic. Subsequently, only the "target" node raises its sending rate. The target node observes reception quality degradation of the other nodes. To determine correlativity among outgoing sessions the target node may send padded traffic to all its remote nodes and observe reception quality of those nodes.

Figure 13A:
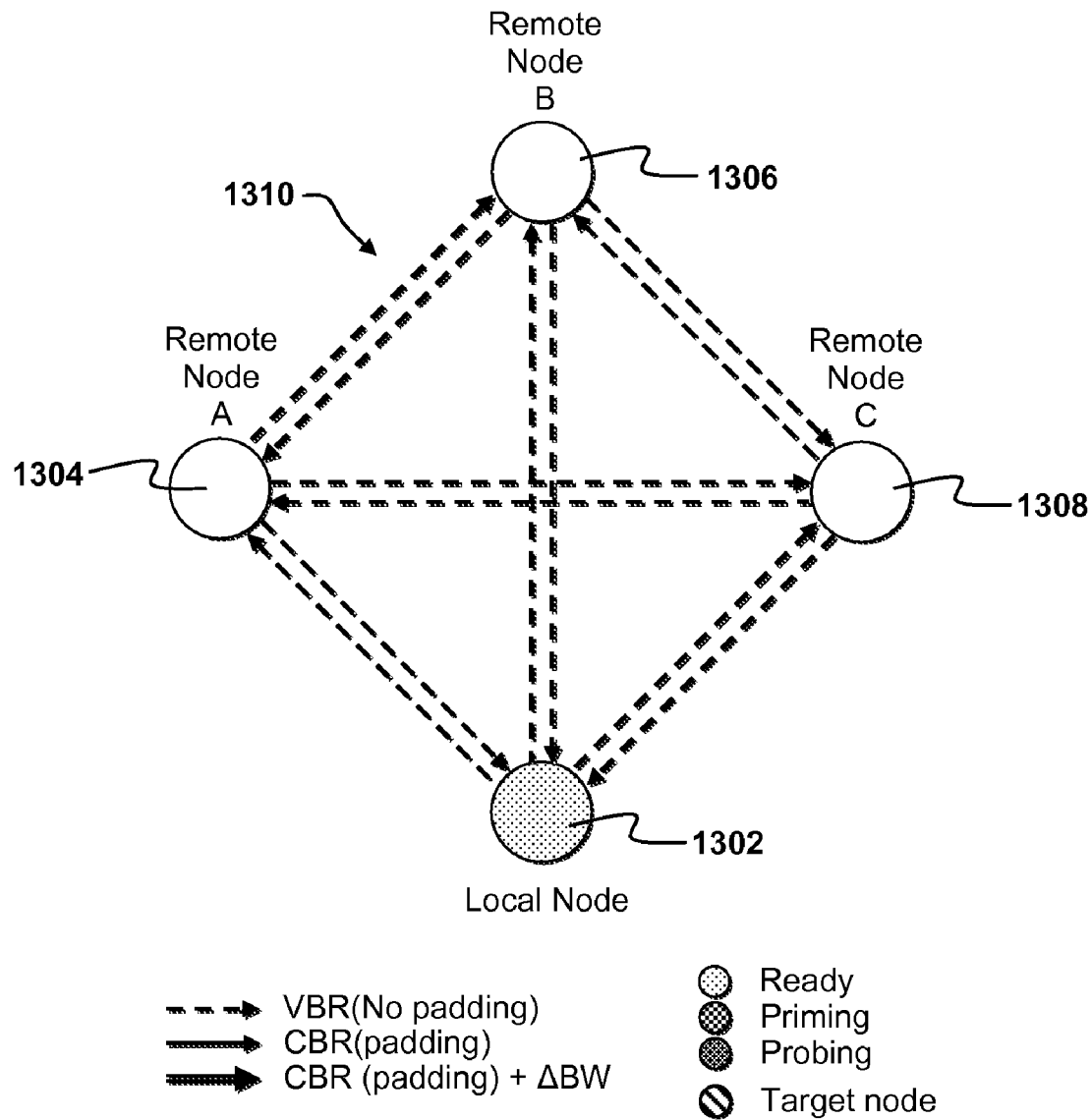
FIGS. 13A-13C are a series of schematic diagrams illustrating bandwidth correlativity detection in conjunction with embodiments of the present invention.
Figure 13B:
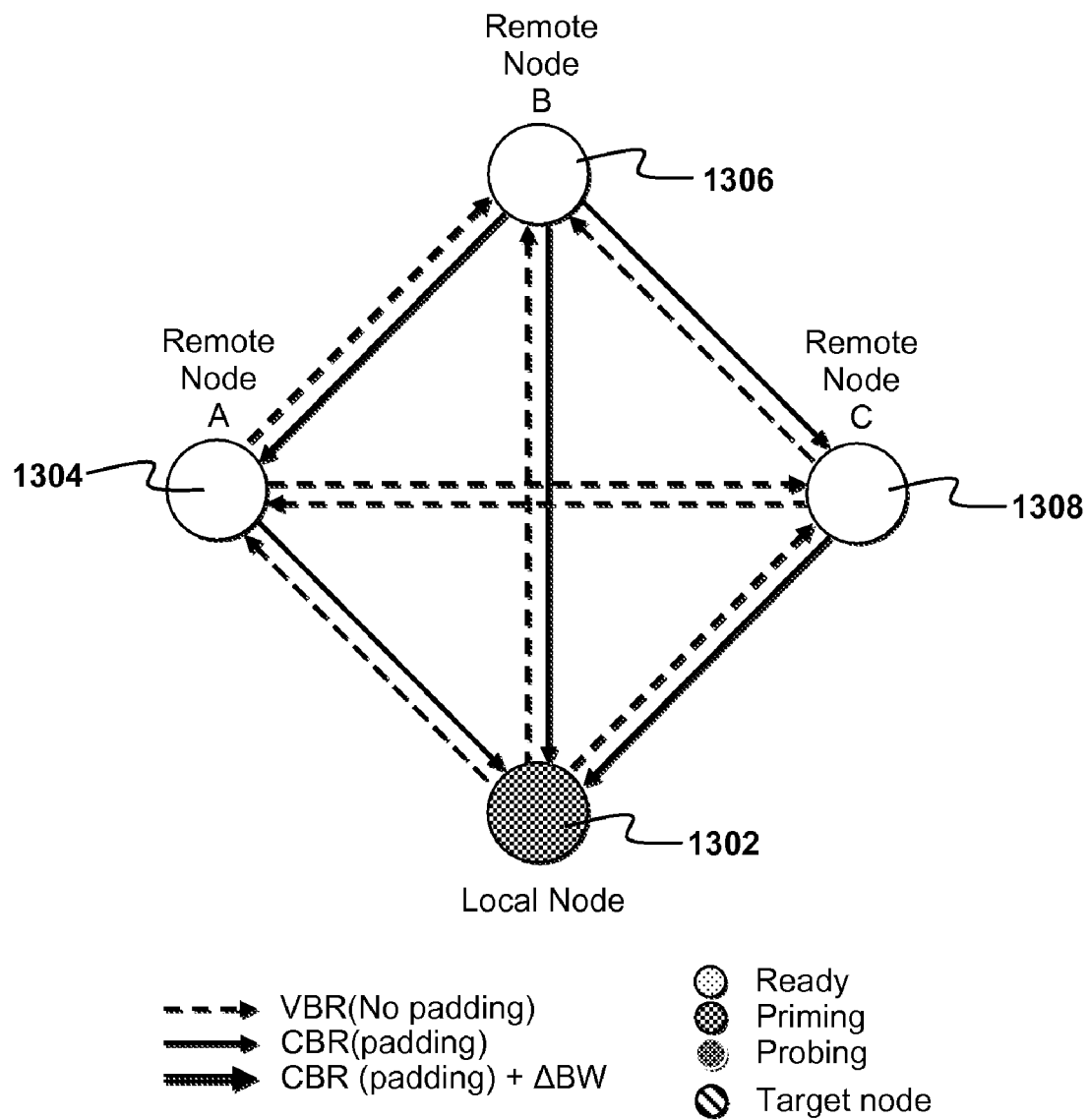
Figure 13C:
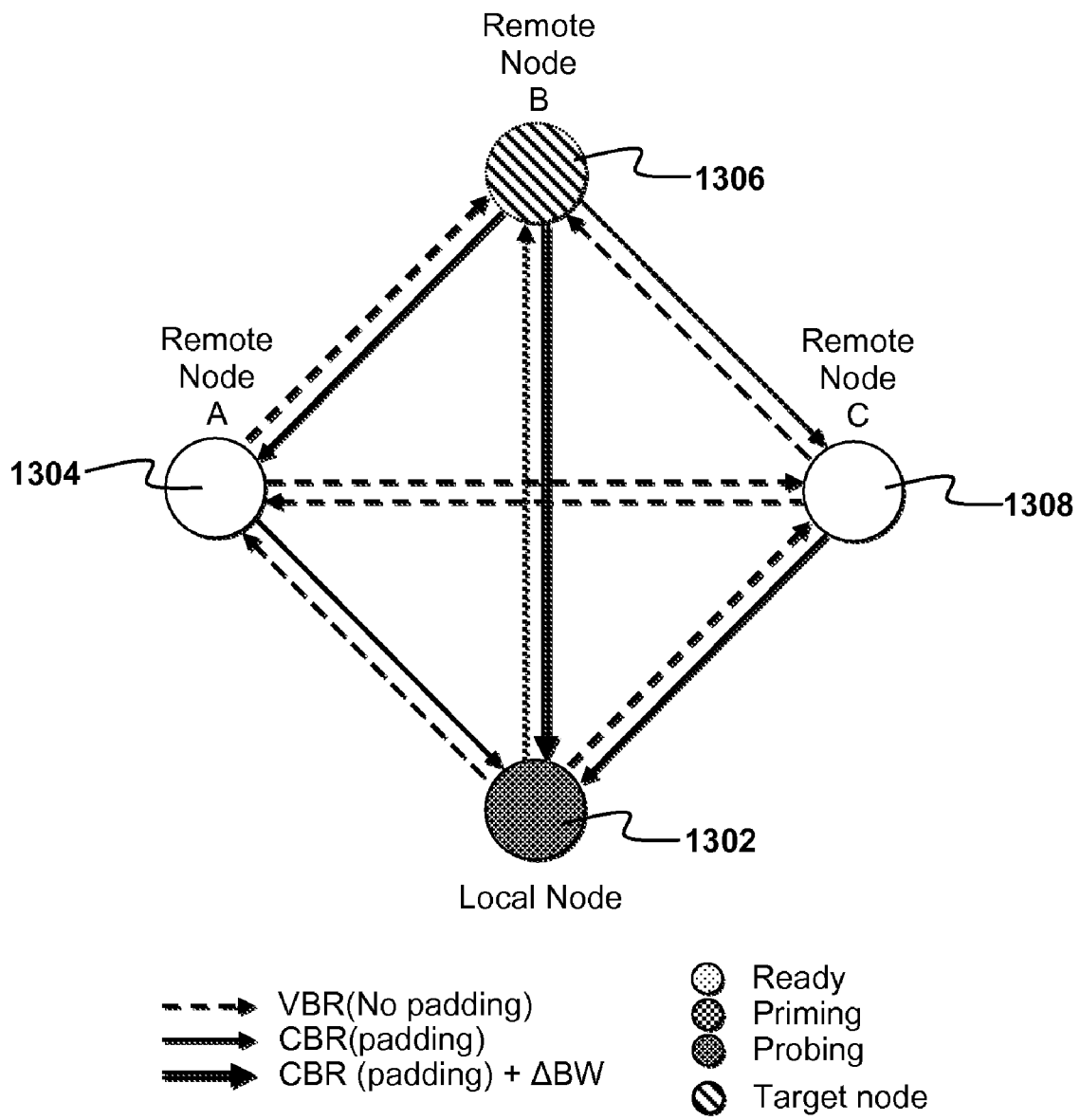

An example of the detection procedure may be understood with reference to FIGS. 13A-13C. In this example, a local node 1302 and remote nodes 1304, 1306 and 1308 may communicate with each other over a network 1310. Initially, as depicted in FIG. 9A, the local node 1302 and remote nodes 1304, 1306 and 1308 are all in the 'Ready' state. The local node 1302 exchanges unpadded variable bitrate data with remote node 1304, remote node 1306, and remote node 1308. The local node 1302 may transition to a 'Priming' state when a timer fires, e.g., as described above with respect to FIG. 8.

In the priming state, the local node 1302 may designate one or more of the remote nodes as target nodes. By way of example, as seen in FIG. 13B, the local node 1302 may designate remote node 1306 as a target node. In the Priming state, the remote nodes 1304, 1306 and 1308 may send padded traffic to the local node. In addition, the target node 1306 may send padded traffic to all of its remote nodes, e.g., the local node 1302, node 1304, and node 1308. In this example, correlativity is not detected in the Priming state. However, if packet loss or delay occurs, the sending rate may be reduced based on considerations of bandwidth correlativity learnt in the past, and the local node 1302 may transition back to 'Ready' state. Specifically, if any target node's outgoing sessions is seen to be degraded (e.g., as reported by the target node's destinations), the local node may go back to the 'Ready' state. If no reception quality degradation is observed, the local node 1302 may transition to the 'Probing' state.

By way of example, the local node 1302 may 'Probe' target Node 1306, as shown in FIG. 13C. Specifically, target Node 1306 starts sending traffic at an increased rate and the local node 1302 observes the reception quality for the traffic. In addition, Node 1306 may check reception quality at remote Node 1304 and remote Node 1308. If packet loss or delay occurs in a non-target session, it may be considered to be correlative with the target session. As used herein a "target" session refers to a session involving communication between the local node and the target node and a "non-target" session refers to a session involving any other communication among the nodes. It is noted that packet loss or delay may be caused by other reasons. Therefore, it may be desirable to calculate the correlativity using a statistical approach.

By way of example, in a statistical approach the correlativity index (CRI) may be calculated by the total number of affected count divided by the total number of probes failed. More specifically, if the local node 1302 is probing targeting node B 1306, then the local node 1302 may see reception quality degradation from node A 1304. The local node 1302 may add +1 to the affected count and +1 to the probe_failure_count. If affected_count is 8 and the number of probing failure is 10, then CRI between node A 1304 and node B 1306 will be 0.8, for example. In some implementations there may be a limitation to the maximum number of probing failure count as 20, in order to get CRI relatively up to current. In other words, a node may be configured such that it remembers the number of affected count for last 20 probing failures.

A similar correlativity check may be performed for the up-link at the target node 1306. If any of the receiving nodes see quality degradation on padded sessions, a previous sending rate may be restored.

It is noted that FIGS. 13A-13C illustrate an example in which a single local node probes a target node. Embodiments of the present invention may also allow for simultaneous 'Probing' of different nodes. Simultaneous 'Probing' may be allowed if target nodes do not collide, i.e., if two local nodes choose the same target node. In such situations, the target node may be assigned to one of the local nodes on a first-come-first-served basis. If the same target is chosen by two different local nodes, the later probing node must abort (skip) it.

In embodiments of the present invention, correlativity may be measured based on a Correlativity Index (CRI). As an example of CRI, consider a situation in which a given node implements three sessions A, B and C. As used herein a "session" refers to an instance of interface with a particular application by a node.

In general the correlativity index (CRI) between any pair of sessions may range between 0 (if one of the sessions is dedicated) and 1 (if the sessions are shared). By way of example, the correlativity index CRI may be calculated as follows:

$CRI$=affected_count/probe_failure _count;

The affected_count and probe_failure_count may be understood by reference to an example. If the local node 1302 is Probing with node B 1306 as a target and if reception quality from node A 1304 was seen degraded, it may be surmised that node A 1304 was affected by the increase in traffic to node B 1306. (affected_count is incremented by +1) and consequently the probing fails (probe_failure_count is incremented by +1). Therefore, if this is the first failure, then CRI between node A 1304 and node B 1306 will be 1/1=1.0. If 10 probing failures, targeting node B 1306, were experienced and 8 were caused by reception quality degradation from node A 1304, then CRI between node A 1304 and node B 1306 will be evaluated as 8/10=0.8.

By way of example, and without loss of generality, Table III illustrates an example of correlativity relationships for the sessions A, B and C.

TABLE III

| | Correlativity Index (CRI) | | |
| --- | --- | --- | --- |
| | A | B | C |
| A | (1.0) | 0.8 | 0.0 |
| B | 0.8 | (1.0) | 0.0 |
| C | 0.0 | 0.0 | (1.0) |

In this example, no two different sessions are shared, but sessions A and B are correlated with each other while sessions A and C and B and C are not. Note the CRI values of 1.0 for correlativity between a given session and itself.

The correlativity indexes of Table III may be used to adjust sending rates if degradation in reception quality is observed during the course of communication between two nodes. For example, if session B experiences reception quality degradation, session B's sending rate may be reduced by an amount $-\Delta BW_B$. In addition session A's bandwidth may also be reduced by an amount $-\Delta BW_A$ that depends on the CRI between session A and session B. By way of example:

$-\Delta BW_A$=0.8/(0.8+1.0)*($-\Delta BW_B$).

It is noted that in this example, if session C experiences reception quality degradation, only C's sending rate will be reduced.

Figure 14:
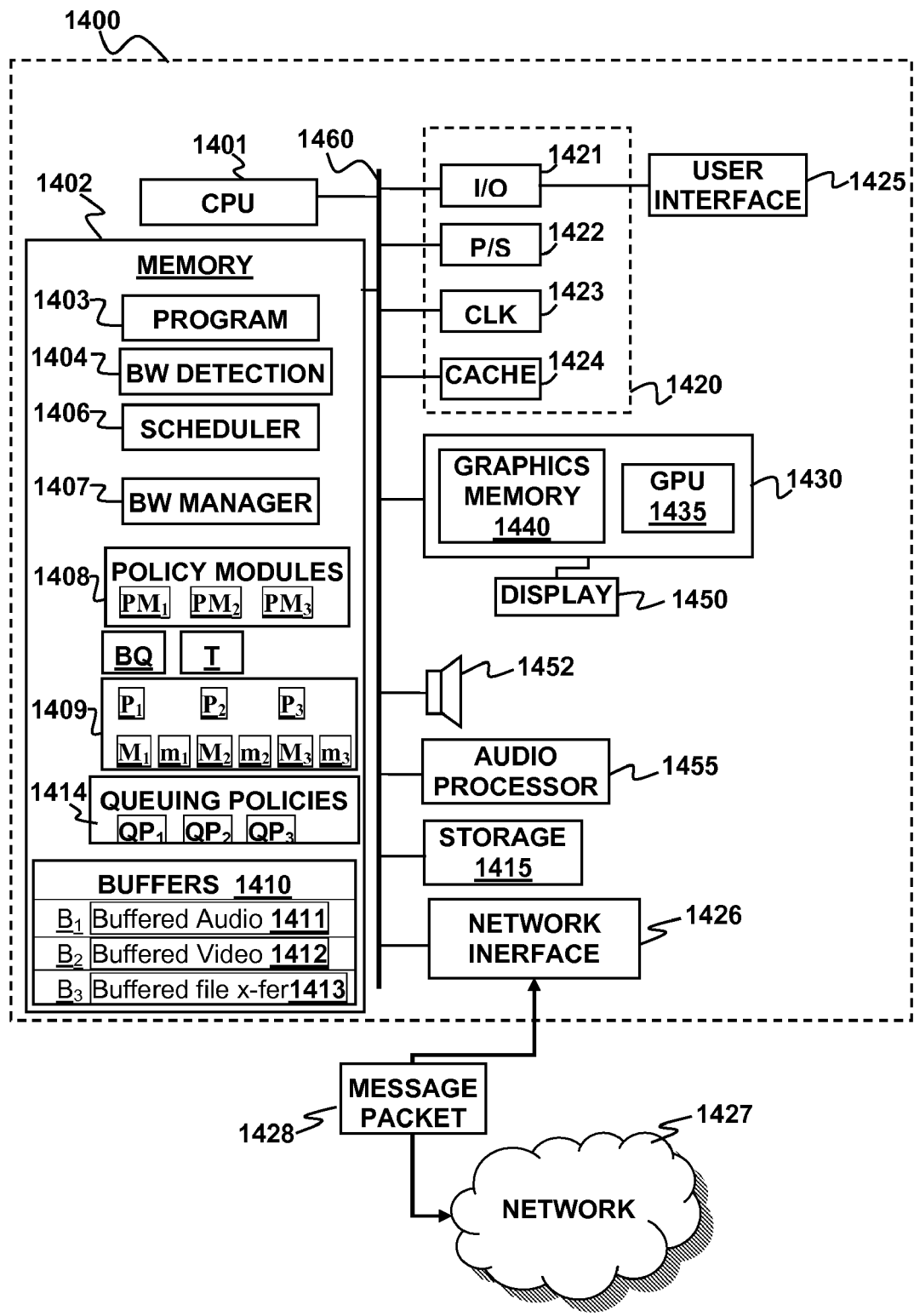
FIG. 14 is a block diagram of a node configured to implement network bandwidth detection and distribution according to an embodiment of the present invention.

FIG. 14 is a block diagram illustrating the components of a node 1400 suitable for implementing network traffic prioritization according to an embodiment of the present invention. By way of example, and without loss of generality, the node 1400 may be implemented as a computer system, such as a personal computer, video game console, personal digital assistant, or other digital device, suitable for practicing an embodiment of the invention. The node 1400 may include a central processing unit (CPU) 1401 configured to run software applications and optionally an operating system. The CPU 1401 may include one or more processing cores. By way of example and without limitation, the CPU 1401 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In the node 1400 a memory 1402 may be coupled to the CPU 1401. The memory 1402 may store applications and data for use by the CPU 1401. The memory 1402 may be in the form of an integrated circuit, e.g., RAM, DRAM, ROM, and the like). A computer program 1403 may be stored in the memory 1402 in the form of instructions that can be executed on the processor 1401. The instructions of the program 1403 may be configured to implement, amongst other things, one or more applications. By way of example, and without loss of generality, the program 1403 may include an application, such as an A/V chat application involving two or more channels of communication. Such channels may include, but are not limited to an audio channel $C_1$, a video channel $C_2$ and a file transfer channel $C_3$. The memory 1402 may also contain instructions, that, when executed by the CPU 1401 implement a bandwidth detection module 1404, which is responsible for estimating the available bandwidth for communication with the other nodes as described hereinabove. In particular, the bandwidth detection module 1404 may implement initial bandwidth estimation, path MTU size determination as described above with respect to FIGS. 7A-7C, and bandwidth adjustment as described above with respect to FIG. 8. In addition, the bandwidth detection module 1404 may implement dynamic bandwidth adjustment, e.g., using the Ready, Priming and Probing states as described above with respect to FIGS. 13A-13C. Furthermore, the memory 1402 may also contain instructions, that, when executed by the CPU 1401 implement a bandwidth management module 1407, which may implement a Global QoS Manager, Session QoS manager and Channel QoS manager as described above with respect to FIG. 9.

The memory 1402 may also contain instructions configured to implement a scheduler 1406, which may be programmed with instructions that implement prioritizing of network traffic, as described above. Examples of such network traffic prioritization are described in detail in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION", filed the same day as the present application, which has been incorporated herein by reference.

The memory 1402 may also contain instructions configured to implement one or more policy modules 1408 that assign priorities for distribution of bandwidth by the scheduler 1406. By way of example and without loss of generality, the policy modules 1408 may include an audio policy module $PM_1$ for the audio channel $C_1$, a video policy module $PM_2$ for the video channel $C_2$, and a file transfer policy $PM_3$ for the file transfer channel $C_3$, as described above. Examples of such policy modules are described in detail in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION", which has been incorporated herein by reference.

The memory 1402 may contain data that is generated by or usable by the program 1403, bandwidth module 1404, scheduler 1406, and policy modules 1408. Specifically, such data may include, but is not limited to policy module parameters 1409, a bandwidth quantum BQ and a time quantum T. The policy module parameters 1409 may include priorities Pt, $P_2$, and $P_3$ respectively associated with the audio channel $C_1$, video channel $C_2$, and file transfer channel $C_3$. The policy module parameters 1409 may further include minimum values $m_1$, $m_2$ and $m_3$ respectively associated with the audio channel $C_1$, video channel $C_2$ and file transfer channel $C_3$ as well as maximum values $M_1$, $M_2$ and $M_3$ respectively associated with the audio channel $C_1$, video channel $C_2$ and file transfer channel $C_3$.

In addition, the memory 1402 may be configured to include one or more buffers 1410 for data generated by the program 1403 for transmission via the communication channels. By way of example and without loss of generality, the buffers 1410 may include an audio buffer B1 configured to buffer audio channel data 1411, a video buffer $B_2$ configured to buffer video channel data 1412 and a file transfer buffer $B_3$ configured to buffer file transfer channel data 1413. The scheduler 1406 may be configured, e.g., by appropriate programming, to implement buffering of data in accordance with one or more queuing policies 1414. By way of example, and without loss of generality, the queuing policies 1414 may include an audio data queuing policy $QP_1$, a video data queuing policy $QP_2$ and a file transfer queuing policy $QP_3$. The queuing policies 1414 may be configured, to determine what happens when multiple sends are made on a single channel, but cannot all be sent immediately, e.g., as described above and in commonly-assigned U.S. Provisional Patent Application No. 60/992,295, to James E. Marr, Yutaka Takeda, Attila Vass, Payton White and Stephen C. Detwiler entitled "NETWORK TRAFFIC PRIORITIZATION".

The node 1400 may further include a storage device 1415 that provides non-volatile storage for applications and data. By way of example, the storage device 1415 may be a fixed disk drive, removable disk drive, flash memory device, tape drive, CD-ROM, DVD-ROM, Blu-ray, HD-DVD, UMD, or other optical storage devices. The node 1400 may also include well-known support functions 1420 commonly used in computing systems. Such support functions may include such features as input/output (I/O) elements 1421, power supplies (P/S) 1422, a clock (CLK) 1423 and cache 1424.

One or more user input devices 1425 may be used to communicate user inputs from one or more users to the node 1400. By way of example, one or more of the user input devices 1425 may be coupled to the node 1400 via the I/O elements 1421. Examples of suitable input devices 1425 include keyboards, mice, joysticks, touch pads, touch screens, light pens, still or video cameras, and/or microphones. In the particular case of A/V chat, it is desirable for the user interface devices 1425 to include both a camera and a microphone. A network interface 1426 allows the node 1400 to communicate with other computer systems via an electronic communications network 1427. The network interface 1426 may include wired or wireless communication over local area networks and wide area networks such as the Internet. The node 1400 may send and receive data and/or requests for files via one or more message packets 1428 over the network 1427.

The node 1400 may further comprise a graphics subsystem 1430, which may include a graphics processing unit (GPU) 1435 and graphics memory 1440. The graphics memory 1440 may include a display memory (e.g., a frame buffer) used for storing pixel data for each pixel of an output image. The graphics memory 1440 may be integrated in the same device as the GPU 1435, connected as a separate device with GPU 1435, and/or implemented within the memory 1402. Pixel data may be provided to the graphics memory 1440 directly from the CPU 1401. Alternatively, the CPU 1401 may provide the GPU 1435 with data and/or instructions defining the desired output images, from which the GPU 1435 may generate the pixel data of one or more output images. The data and/or instructions defining the desired output images may be stored in memory 1410 and/or graphics memory 1440. In an embodiment, the GPU 1435 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 1435 may further include one or more programmable execution units capable of executing shader programs.

The graphics subsystem 1430 may periodically output pixel data for an image from graphics memory 1440 to be displayed on a display device 1450. The display device 1450 may be any device capable of displaying visual information in response to a signal from the computer system 1400, including CRT, LCD, plasma, and OLED displays. The node 1400 may provide the display device 1450 with an analog or digital signal. By way of example, the display 1450 may include a cathode ray tube (CRT) or flat panel screen that displays text, numerals, graphical symbols, or images. In addition, the node 1400 may include one or more audio speakers 1452 that produce audible or otherwise detectable sounds. To facilitate generation of such sounds, the node 1400 may further include an audio processor 1455 adapted to generate analog or digital audio output from instructions and/or data provided by the CPU 1401, memory 1402, and/or storage 1415. In the particular case of A/V chat, it is desirable for the node 1400 to include a graphical display device 1450 and an audio speaker 1452.

The components of the node 1400, including the CPU 1401, memory 1402, support functions 1420, data storage 1415, user input devices 1425, network interface 1426, graphics subsystem 1430, speaker 1452 and audio processor 1455 may be operably connected to each other via one or more data buses 1460. These components may be implemented in hardware, software, firmware or some combination of two or more of these.

By way of example, and without loss of generality, software designers may implement embodiments of the present invention in software applications by creating a plurality of communication channels, and assigning a priority and a queuing policy to each one. Data could then be sent through these configured communication channels and the scheduler 1406, policy modules 1408, and queuing policies 1414 may control the actual transmission of the data over the network 1427.

Embodiments of the present invention may avoid unfair bandwidth distribution during communication between nodes over a network. Serialization for probing operation is not required in order to implement such embodiments. In addition, the three-state congestion control (Ready, Priming and Probe) described above has been tested and shown to work very well. For example, in a situation involving 3-way A/V chat, involving three nodes, this three-state congestion control worked well adjusting sending rate and fairly distributing available bandwidth. Bandwidth distribution tended to stabilize in about 10 to 20 seconds after a new party joined the chat session.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. In the claims that follow, the expressions first and second are used to distinguish between different elements and do not imply any particular order or sequence. The appended claims are not to be interpreted as including means-plus-function limitations, unless such a limitation is explicitly recited in a given claim using the phrase "means for."

What is claimed is:

1. In a node configured to communicate with one or more other nodes over a network, a method for network bandwidth detection, distribution and traffic prioritization, the method comprising:
   a) detecting an available bandwidth for communication between the first node and a second node;
   b) determining a distribution for the available bandwidth among the two or more communication channels for a single application by distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
   c) transmitting an amount of ready data, if any, for each channel $C_i$ that is greater than zero and less than or equal to the size $R_i$ of the reserved portion for that channel; and
   d) redistributing any unused part of any reserved portion $R_i$ amongst any of the N communication channels $C_1 \ldots C_N$ having un-transmitted ready data.

2. The method of claim 1 wherein the size $R_i$ of a given reserved portion is determined by:

$$R_i = BQ \cdot \frac{P_i}{\sum_j P_j},$$

where $$\sum_j P_j$$

is a sum of the priorities for all of the two or more channels.

3. The method of claim 1, wherein d) takes place before b) and wherein d) includes redistributing any unused part of any reserved portion $R_i$ from a previous time quantum amongst any of the two or more communication channels having un-transmitted buffered data.

4. The method of claim 1, further comprising determining the bandwidth quantum BQ prior to b).

5. The method of claim 1 wherein the two or more communications channels include an audio channel, a video channel, and a file transfer channel.

6. The method of claim 1, further comprising, if the size $R_i$ assigned to a given channel $C_i$ is greater than a predetermined maximum size $M_i$ for the channel $C_i$, allocating a difference $R_i$-$M_i$ to one or more other channels.

7. The method of claim 1, further comprising, if the size $R_i$ for a given channel $C_i$ is less than a predetermined minimum size $m_i$ for the channel $C_i$, excluding from a) any channels with lower priority than $C_i$ until the minimum size $m_i$ has been met.

8. The method of claim 7 wherein if more than one of the channels has a predetermined minimum size, b) includes initially distributing the bandwidth quantum BQ to a highest priority channel with a minimum size and any other channels having a higher priority.

9. The method of claim 1 wherein b) comprises determining each priority $P_i$ according to a predetermined policy module for the corresponding channel $C_i$.

10. The method of claim 9, wherein b) further comprises assigning a maximum and/or minimum value to the size $R_i$ according to the predetermined policy module.

11. The method of claim 1, wherein b) further comprises assigning a maximum and/or minimum value to the size $R_i$ according to a predetermined policy module for the corresponding channel $C_i$.

12. The method of claim 1 wherein the single application is an audio-video chat application.

13. The method of claim 1, wherein c) further comprises implementing a queuing policy for one or more of the communication channels $C_1 \ldots C_N$.

14. The method of claim 13 wherein implementing the queuing policy includes buffering one or more data units by a given communication channel $C_i$ that cannot be transmitted during the time quantum T.

15. The method of claim 13 wherein implementing the queuing policy includes discarding an older data unit in favor of a new data unit.

16. The method of claim 15 wherein the older data unit and new data unit comprise audio frames or video frames.

17. The method of claim 1 wherein a) includes
detecting a traffic status with the second node in response to one or more message packets received from the first node;
sending a request from the first node to the second node, wherein the request includes a sending rate for the first node to send message packets to the second node, wherein the sending rate is determined from the traffic status.

18. The method of claim 1 wherein a) includes detecting saturation of the available bandwidth.

19. The method of claim 1, further comprising padding the available bandwidth during communication between the first node and the second node.

20. The method of claim 1 wherein a) includes:
sending one or more message packets from the first node to the second node;
receiving a sending rate from the second node in response to the one or more message packets; and
sending data from the first node to the second node at the sending rate.

21. A node configured to communicate with one or more other nodes over a network, the node comprising:
a processor; and
a memory coupled to the processor, the memory having therein a set of instructions executable by the processor, the instructions being configured to implement a method for prioritizing network traffic among two or more distinct channels of communication within a single application, the method comprising:
a) detecting an available bandwidth for communication between the first node and a second node;
b) determining a distribution for the available bandwidth among the two or more communication channels by distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
c) transmitting an amount of ready data, if any, for each channel $C_i$ that is greater than zero and less than or equal to the size $R_i$ of the reserved portion for that channel; and
d) redistributing any unused part of any reserved portion $R_i$ amongst any of the N communication channels $C_1 \ldots C_N$ having un-transmitted ready data.

22. The node of claim 21, further comprising one or more instructions in memory configured to implement one or more policy modules configured to determine the priorities $P_1 \ldots P_N$ for the corresponding channels $C_1 \ldots C_N$.

23. The node of claim 22, wherein one or more of the policy modules is configured to assign a maximum and/or minimum size to an amount of data that can be transmitted during the time quantum T on one or more of the channels $C_1 \ldots C_N$.

24. The node of claim 22, wherein one or more of the policy modules is configured to assign a maximum and size $M_i$ to an amount of data that can be transmitted during the time quantum T over a given channel $C_i$, wherein the set of instructions is configured to allocate a difference $R_i$-$M_i$ from a given channel $C_i$ to one or more other channels if the size $R_i$ assigned to the given channel $C_i$ is greater than the maximum size $M_i$.

25. The node of claim 22, wherein one or more of the policy modules is configured to assign a minimum size $m_i$ to an amount of data that can be transmitted during the time quantum T over a given channel $C_i$, wherein the set of instructions is configured to exclude from c) any channels with lower priority than a channel $C_i$ until an amount of data greater than or equal to the minimum size $m_i$ has been sent over the channel $C_i$.

26. The node of claim 25, wherein the set of instructions is configured such that c) includes initially distributing the bandwidth quantum BQ to a highest priority channel with a minimum size and any other channels having a higher priority if more than one of the channels is assigned a minimum size to an amount of data that can be transmitted during the time quantum T.

27. The node of claim 21, wherein the set of instructions is configured such that d) further comprises implementing a queuing policy for one or more of the communication channels $C_1 \ldots C_N$.

28. The node of claim 27, wherein the set of instructions is configured such that implementing the queuing policy includes buffering one or more data units by a given communication channel $C_i$ that cannot be transmitted during the time quantum T.

29. The node of claim 27, wherein the set of instructions is configured such that implementing the queuing policy includes discarding an older data unit in favor of a newer data unit.

30. The node of claim 29 wherein the older data unit and newer data unit comprise one or more audio frames or video frames.

31. The node of claim 21 wherein the single application is an audio-video chat application.

32. The node of claim 21 wherein the two or more communications channels include an audio channel, a video channel, and a file transfer channel.

33. The node of claim 21, further comprising a bandwidth module configured to determine the bandwidth quantum BQ.

34. A non-transitory computer-readable storage medium having program instructions embodied therein, wherein the program instructions are computer-executable on a node to implement a method for prioritizing network traffic among two or more distinct channels of communication within a single application, the method comprising:
a) detecting an available bandwidth for communication between the first node and a second node;
b) determining a distribution for the available bandwidth among the two or more communication channels by distributing a bandwidth quantum BQ for a time quantum T amongst $N \geq 2$ communication channels $C_1 \ldots C_N$, based on priorities $P_1 \ldots P_N$ correspondingly assigned to channels $C_1 \ldots C_N$, wherein each channel is assigned a reserved portion of the bandwidth quantum BQ, wherein a size $R_i$ of the reserved portion assigned to a given channel $C_i$ of the N channels $C_1 \ldots C_N$, is greater than zero and wherein $R_i$ is determined based on the corresponding priority $P_i$ assigned to the given channel $C_i$;
c) transmitting an amount of ready data, if any, for each channel $C_i$ that is greater than zero and less than or equal to the size $R_i$ of the reserved portion for that channel; and
d) redistributing any unused part of any reserved portion $R_i$ amongst any of the N communication channels $C_1 \ldots C_N$ having un-transmitted ready data.

* * * * *